United States Patent [19]

Mühlebach et al.

[11] Patent Number: 6,162,883
[45] Date of Patent: Dec. 19, 2000

[54] CATALYST MIXTURE AND POLYMERIZABLE COMPOSITION

[75] Inventors: Andreas Mühlebach, Belfaux; Paul Adriaan Van Der Schaaf, Fribourg; Andreas Hafner, Gelterkinden, all of Switzerland

[73] Assignee: Ciba Specialty Chemcials Corporation, Tarrytown, N.Y.

[21] Appl. No.: 09/155,561

[22] PCT Filed: Mar. 27, 1997

[86] PCT No.: PCT/EP97/01579

§ 371 Date: Sep. 30, 1998

§ 102(e) Date: Sep. 30, 1998

[87] PCT Pub. No.: WO97/38036

PCT Pub. Date: Oct. 16, 1997

[30] Foreign Application Priority Data

Apr. 4, 1996 [CH] Switzerland ............... 874/96

[51] Int. Cl.[7] ............... C08G 61/08; C08G 61/12
[52] U.S. Cl. ............... 526/118; 526/281; 526/283; 526/308; 526/309; 502/152; 502/155; 252/182.14; 252/182.15; 252/182.17; 252/182.18; 428/403; 428/404; 428/426; 428/457; 428/689; 428/698
[58] Field of Search ............... 526/118, 281, 526/283, 308, 309; 502/152, 155; 252/182.14, 182.15, 182.17, 182.18; 428/403, 404, 426, 457, 689, 698

[56] References Cited

U.S. PATENT DOCUMENTS 5,266,665 11/1993 Hardiman ............... 526/283 X
5,849,851 12/1998 Grubbs et al. ............... 526/283 X

FOREIGN PATENT DOCUMENTS

WO 93/20111 10/1993 WIPO.
WO 95/07310 3/1995 WIPO.
WO 96/04289 2/1996 WIPO.

OTHER PUBLICATIONS

Demonceau et al, J. Molecular Catalysis, vol. 76, pp. 123–132 (1992).
Kanaoka et al, Macromolecules, vol. 28, pp. 4707–4713 (1995).
Tanelian et al, Tetrahedron Letters, vol. 52, pp. 4589–4592 (1977).

*Primary Examiner*—Fred Teskin
*Attorney, Agent, or Firm*—Luther A. R. Hall

[57] ABSTRACT

A mixture of at least one thermal carbene-free ruthenium catalyst A and at least one thermal ruthenium carbene catalyst B, both of which initiate the ring-opening metathesis polymerization on their own, said catalysts being present in a weight ratio of A to B from 10:1 to 1:10. By adding this mixture even in small amounts, the ring-opening metathesis polymerization of strained cycloolefins can be effectively catalyzed.

15 Claims, No Drawings

CATALYST MIXTURE AND POLYMERIZABLE COMPOSITION

The present invention relates to a mixture consisting of at least one thermal ruthenium catalyst A and at least one ruthenium carbene catalyst B, both of which initiate the ring-opening metathesis polymerisation on their own, said catalysts being present in a weight ratio of A to B from 10:1 to 1:10; to a composition consisting of at least one strained cycloolefin and a catalytically effective amount of the ruthenium catalyst mixture; to a process for the polymerisation of strained cycloolefins; to shaped articles of polymers of said composition and to the use of the ruthenium catalyst mixture for the ring-opening metathesis polymerisation of strained cycloolefins.

The ring-opening metathesis polymerisation of strained cycloolefins such as norbornene with catalysts selected from the ruthenium compound group is known and has been repeatedly described in the literature.

A. Demonceau et al. in J. Mol. Catal. 76:123–132 (1992), for example, describe ruthenium compounds as suitable metathesis polymerisation catalysts of e.g. norbornene, where the reactivity can be increased by the addition of diazo esters.

In Tetrahedron Letters 52:4589–4592 (1977), C. Tanelian et al. report that the ruthenium compound $RuCl_2[P(C_6H_5)_3]_3$ is a suitable catalyst for the metathesis polymerisation but that it is deactivated by dicyclopentadiene and then no polymers are formed.

WO 93/20111 proposes the use of ruthenium compounds with phosphine ligands, for example $[(H_5C_6)_3P]_2Cl_2Ru=CH—CH=C(C_6H_5)_2$, as thermal catalysts for the ring-op thesis polymerisation of strained cycloolefins, where cyclodienes such as dicyclopentadiene act as catalyst inhibitors and therefore cannot be polymerised. These "metal carbenes" are sparingly soluble compounds, so that the polymerisations are only possible in polar and, where appropriate, protic solutions. The same catalysts are described by S. Kanaoka in Macromolecules 1995, 28, pages 4707 to 4713 under the same conditions of solution polymerisation for the preparation of copolymers with silicon-containing norbornene derivatives.

In Polym. Prepr. 1995, 36, pages 237 to 238, C. Fraser et al. describe ruthenium carbenes having a $Ru=CH—C_6H_5$ group which are effective catalysts for the metathesis polymerisation. A substantial disadvantage of these catalysts is their high reactivity which makes it necessary to process polymerisable compositions directly after the components are mixed.

WO 95/07310 describes a ring-opening photopolymerisation of strained cycloolefins under the action of ruthenium compounds with photolabile ligands as catalysts. After being irradiated, these catalysts can also be used as thermal catalysts.

Carbene-free ruthenium catalysts normally must be used in amounts of more than 0.3% by weight, and ruthenium carbene catalysts normally must be used in amounts of more than 0.1% by weight, based on the cycloolefin, in order to obtain, within reasonable polymerisation times, well polymerised shaped artices having good mechanical and physical properties. If lower amounts are used, the polymerisation is not complete anymore which can be detected by the inherent smell of the monomers used and their bad physical and mechanical properties. It is not possible to prepare useful shaped articles using such low amounts.

The ruthenium catalysts are expensive and their use in higher amounts as catalysts is uneconomical. Another disadvantage is that the use of high amounts of catalysts also leads to high amounts of ruthenium residues in the polymers, which is undesirable for toxic reasons, adversely affects the stability of the polymer and must be avoided in particular where there is contact with electrical or electronic components.

Surprisingly, it has now been found that the high reactivity of the ruthenium carbene catalysts can be reduced, a latency of polymerisable compositions can be achieved and, within a specific scope, even the reactivity can be adjusted, which obviates immediate processing owing to the improved storage stability achieved, if mixtures consisting of carbene-free (a) ruthenium catalysts and (b) ruthenium carbene catalysts are used. It has also, surprisingly, been found that despite their latency, the catalyst mixtures have very high reactivity and that therefore the mixture can be used in substantially lower, and accordingly in more economic, amounts than the individual components, still giving polymers having comparable physical and mechanical properties. Furthermore, the metal content in the polymers can be reduced in this manner, which enhances the properties of the polymer and which also permits applications in contact with electrical or electronic components. The described effects are particularly pronounced when mixtures consisting of carbene-free (a) ruthenium catalysts with phosphine ligands substituted by sterically demanding hydrocarbon radicals, and with (b) ruthenium carbene catalysts are used. It has also been found that ruthenium compounds which do not initiate the polymerisation when used in high amounts of e.g. 0.5% by weight, result in useful shaped articles if they are added in smaller amounts in admixture with ruthenium carbene catalysts.

In one of its aspects, this invention relates to a mixture of at least one thermal carbene-free ruthenium catalyst A and at least one thermal ruthenium carbene catalyst B, both of which initiate the ring-opening metathesis polymerisation on their own, said catalysts being present in a weight ratio of A to B from 10:1 to 1:10.

Within the scope of this invention, thermal signifies that the ring-opening metathesis polymerisation is initiated by the catalysts under the action of heat.

The weight ratio of A to B is preferably from 8:1 to 1:2, more preferably from 6:1 to 1:1, particularly preferably from 5:1 to 1:1 and, most preferably, from 3:1 to 1:1.

The carbene-free ruthenium catalysts A may be compounds having one (mononuclear) or two (binucluear) ruthenium atoms. The binuclear ruthenium compounds may typically be the of formula XI

(XI)

wherein $X_{001}$ is Cl, Br or I, preferably Cl, and $T_{001}$ is unsubstituted or $C_1$–$C_6$alkyl-substituted $C_6$–$C_{18}$arene or $C_4$–$C_{17}$heteroarene.

Arene preferably contains 6 to 12 carbon atoms and heteroarene preferably contains 4 to 10 carbon atoms and 1 or 2 hetero atoms selected from the group consisting of O, N and S in one or several rings. Arene and heteroarene can be monocyclic or condensed rings. Typical examples of alkyl substituents are methyl, ethyl, n- and i-propyl, n-, i- and t-butyl.

Typical examples of arenes are benzene, toluene, xylene, cumene, naphthalene, anthracene, naphthacene, chrysene and biphenyl. Typical examples of heteroarene are furan, thiophene, benzofuran, benzothiophene, pyrrole and pyridine.

Of the thermal ruthenium catalysts, those are particularly suitable and preferred that contain phosphine ligands. Particularly preferred are divalent-cationic ruthenium compounds containing at least one phosphine group and a total of 2 to 5 ligands bonded to the ruthenium atom and which contain acid anions for charge equalisation.

In the ruthenium compounds for use according to this invention a monophosphine can be bound to the metal atom once, twice or three times, and a diphosphine can be bound to the metal atom once. In these ruthenium catalysts a total of preferably 1 to 4, more preferably 1 to 3 and, particularly preferably, 2 ligands are bonded. The phosphine ligands preferably conform to formulae VII and VIIa $$PR_{26}R_{27}R_{28} \quad (VII),$$

$$R_{26}R_{27}P-Z_1-PR_{26}R_{27} \quad (VIIa),$$

wherein $R_{26}$, $R_{27}$ and $R_{28}$ are each independently of one another H, $C_1-C_{20}$alkyl, $C_1-C_{20}$-alkoxy; $C_4-C_{12}$cycloalkyl or cycloalkoxy which is unsubstituted or substituted by $C_1-C_6$alkyl, $C_1-C_6$haloalkyl or $C_1-C_6$alkoxy, or $C_6-C_{16}$aryl or $C_6-C_{16}$aryloxy which is unsubstituted or substituted by $C_1-C_6$alkyl, $C_1-C_6$haloalkyl or $C_1-C_6$alkoxy, or $C_7-C_{16}$aralkyl or $C_7-C_{16}$aralkyloxy which is unsubstituted or substituted by $C_1-C_6$alkyl, $C_1-C_6$haloalkyl or $C_1-C_6$alkoxy; $R_{26}$ and $R_{27}$ together are tetra- or pentamethylene or tetra- or pentamethylenedioxyl, each of which is unsubstituted or substituted by $C_1-C_6$-alkyl, $C_1-C_6$haloalkyl or $C_1-C_6$alkoxy, or tetra- or pentamethylene or tetra- or pentamethylenedioxyl, each of which is unsubstituted or substituted by $C_1-C_6$alkyl, $C_1-C_6$haloalkyl or $C_1-C_6$-alkoxy and condensed with 1 or 2 1,2-phenylene, or tetramethylenedioxyl which is unsubstituted or substituted by $C_1-C_6$alkyl, $C_1-C_6$haloalkyl or $C_1-C_6$alkoxy and condensed in the 1,2- and 3,4-positions with 1,2-phenylene, and $R_{28}$ is as defined above; and $Z_1$ is linear or branched, unsubstituted or $C_1-C_4$alkoxy-substituted $C_2-C_{12}$alkylene, unsubstituted or $C_1-C_4$alkyl- or $C_1-C_4$alkoxy-substituted 1,2- or 1,3-cycloalkylene of 4 to 8 carbon atoms, or unsubstituted or $C_1-C_4$alkyl- or $C_1-C_4$alkoxy-substituted 1,2- or 1,3-heterocycloalkylene having 5 or 6 ring members and a hetero atom selected from the O or N group.

$R_{26}$, $R_{27}$ and $R_{28}$ are preferably identical. Particularly preferred are also sterically demanding radicals, typically branched, preferably α-branched alkyl, or cyclic radicals. Hydrocarbon radicals are also particularly preferred. Preferred phoshines are those of formula VII, which are tertiary phosphines, and diphosphines of formula VIIa, which are ditertiary diphosphines.

$R_{26}$, $R_{27}$ and $R_{28}$ defined as alkyl may be linear or branched and may contain preferably 1 to 12, more preferably 1 to 8 and, particularly preferably, 1 to 6 carbon atoms. Illustrative examples of alkyl are methyl, ethyl, n- and i-propyl, n-, i- and t-butyl, the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3-pentyl and 1-, 2-, 3- or 4-hexyl.

If $R_{26}$, $R_{27}$ and $R_{28}$ are substituted, the substituents are preferably $C_1-C_4$alkyl, $C_1-C_4$haloalkyl or $C_1-C_4$alkoxy. Halogen is preferably Cl and, particularly preferably, F. Typical examples of preferred substituents are methyl, methoxy, ethyl, ethoxy and trifluoromethyl. $R_{26}$, $R_{27}$ and $R_{28}$ are preferably substituted one to three times.

$R_{26}$, $R_{27}$ and $R_{28}$ defined as cycloalkyl are preferably $C_5-C_8$cycloalkyl and, particularly preferably, $C_5$- or $C_6$cycloalkyl. Some examples are cyclobutyl, cycloheptyl, cyclooctyl and, preferably, cyclopentyl and cyclohexyl. Typical examples of substituted cycloalkyl are methyl-, dimethyl-, trimethyl-, methoxy-, dimethoxy-, trimethoxy-, trifluoromethyl-, bistrifluoromethyl and tristrifluoromethyl-cyclopentyl and -cyclohexyl.

$R_{26}$, $R_{27}$ and $R_{28}$ defined as aryl are preferably $C_6-C_{12}$aryl and, particularly preferably, phenyl or naphthyl. Typical examples of substituted aryl are methyl-, dimethyl-, trimethyl-, methoxy-, dimethoxy-, trimethoxy-, trifluoromethyl-, bistrifluoromethyl- and tristrifluoromethylphenyl.

$R_{26}$, $R_{27}$ and $R_{28}$ defined as aralkyl are preferably $C_7-C_{13}$aralkyl, the alkylene group in aralkyl preferably being methylene. Aralkyl is particularly preferably benzyl. Illustrative examples of substituted aralkyl are methyl-, dimethyl-, trimethyl-, methoxy-, dimethoxy-, trimethoxy-, trifluoromethyl-, bistrifluoromethyl- and tristrifluoromethylbenzyl.

Illustrative examples of tetra- and pentamethylene which are bonded to the P atom and which are unsubstituted or substituted or condensed, are

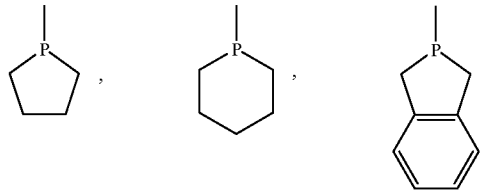

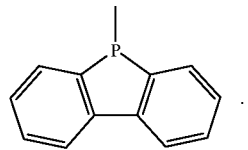

Other suitable phosphines are cycloaliphates which are brigded with a $=PR_a$ group containing 6 to 8 ring carbon atoms, for example

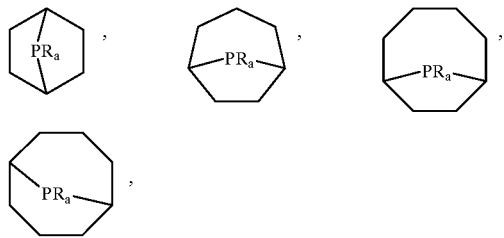

wherein $R_a$ is $C_1-C_{20}$alkyl, preferably $C_1-C_{12}$alkyl, particularly preferably $C_1-C_6$alkyl, cyclohexyl, benzyl, or phenyl which is unsubstituted or substituted by 1 or 2 $C_1-C_4$alkyl.

$Z_1$ defined as linear or branched alkylene is preferably 1,2-alkylene or 1,3-alkylene of preferably 2 to 6 carbon atoms, typically ethylene, 1,2-propylene or 1,2-butylene.

Typical examples of $Z_1$ defined as cycloalkylene are 1,2- and 1,3-cyclopentylene, and 1,2- or 1,3-cyclohexylene. Typical examples of $Z_1$ defined as heterocycloalkylene are 1,2- and 1,3-pyrrolidine, 1,2- and 1,3-piperidine, and 1,2- and 1,3-tetrahydrofuran.

In a preferred embodiment of this invention, the phosphine ligands conform to formula VII, wherein $R_{26}$, $R_{27}$ and $R_{28}$ are each independently of one another H, $C_1$–$C_6$alkyl, unsubstituted or $C_1$–$C_4$alkyl-substituted cyclopentyl or cyclohexyl, or phenyl which is unsubstituted or substituted by $C_1$–$C_4$alkyl, $C_1$–$C_4$alkoxy or trifluoromethyl, or benzyl which is unsubstituted or substituted by $C_1$–$C_4$alkyl, $C_1$–$C_4$alkoxy or trifluoromethyl. Particularly preferred examples of phosphine ligands of formula VII are $(C_6H_5)H_2P$, $(3\text{-}CH_3\text{-}_6\text{-}t\text{-}C_4H_9\text{—}C_6H_3)_3P$, $(3\text{-}CH_3\text{-}6\text{-}t\text{-}C_4H_9\text{—}C_6H_3)_3P$, $PH_3$, $(2,6\text{-}Di\text{-}t\text{-}C_4H_9\text{—}C_6H_3)_3P$, $(2,3\text{-}Di\text{-}t\text{-}C_4H_9\text{—}C_6H_3)_3P$, $(2,4\text{-}Di\text{-}t\text{-}C_4H_9\text{—}C_6H_3)_3P$, $(2,4\text{-}Di\text{-}CH_3\text{—}C_6H_3)_3P$, $(2,6\text{-}Di\text{-}CH_3\text{—}C_6H_3)_3P$, $(2\text{-}CH_3\text{-}6\text{-}t\text{-}C_4H_9\text{—}C_6H_3)_3P$, $(CH_3)_3P$, $(2\text{-}i\text{-}C_3H_7\text{—}C_6H_4)_3P$, $(3\text{-}i\text{-}C_3H_7\text{—}C_6H_4)_3P$, $(4\text{-}i\text{-}C_3H_7\text{—}C_6H_4)_3P$, $(2\text{-}n\text{-}C_4H_9\text{—}C_6H_4)_3P$, $(3\text{-}n\text{-}C_4H_9\text{—}C_6H_4)_3P$, $(4\text{-}n\text{-}C_4H_9\text{—}C_6H_4)_3P$, $(2\text{-}i\text{-}C_4H_9\text{—}C_6H_4)_3P$, $(3\text{-}i\text{-}C_4H_9\text{—}C_6H_4)_3P$, $(4\text{-}i\text{-}C_4H_9\text{—}C_6H_4)_3P$, $(2\text{-}t\text{-}C_4H_9\text{—}C_6H_4)_3P$, $(3\text{-}t\text{-}C_4H_9\text{—}C_6H_4)_3P$, $(4\text{-}t\text{-}C_4H_9\text{—}C_6H_4)_3P$, $(4\text{-}C_2H_5\text{—}C_6H_4)_3P$, $(3\text{-}n\text{-}C_3H_7\text{—}C_6H_4)_3P$, $(2\text{-}n\text{-}C_3H_7\text{—}C_6H_4)_3P$, $(4\text{-}C_3H_7\text{—}C_6H_4)_3P$, $(C_2H_5)_2HP$, $(3\text{-}CH_3\text{—}C_6H_4)_3P$, $(4\text{-}CH_3\text{—}C_6H_4)_3P$, $(2\text{-}C_2H_5\text{—}C_6H_4)_3P$, $(3\text{-}C_2H_5\text{—}C_6H_4)_3P$, $(i\text{-}C_3H_7)H_2P$, $(n\text{-}C_4H_9)H_2P$, $(C_6H_5CH_2)_3P$, $(C_6H_5CH_2)H_2P$, $(2\text{-}CH_3\text{—}C_6H_4)_3P$, $(C_6H_5)_3P$, $(C_5H_{11})H_2P$, $(C_6H_5CH_2)_3P$, $(n\text{-}C_3H_7)_2HP$, $(i\text{-}C_3H_7)_2HP$, $(n\text{-}C_4H_9)_2HP$, $(n\text{-}C_3H_7)H_2P$, $(C_2H_5)H_2P$, $(C_5H_{11})_3P$, $(C_6H_5)_2HP$, $(C_5H_{11})_2HP$, $(n\text{-}C_3H_7)_3P$, $(i\text{-}C_3H_7)_3P$, $(n\text{-}C_4H_9)_3P$, $(CH_3)_2HP$, $(C_2H_5)_3P$, $(C_6H_{11})_3P$, $(C_6H_{11})_2HP$, $(C_5H_9)_3P$, $(C_5H_9)_2HP$ and $(CH_3)H_2P$.

Particularly preferred phosphines are triphenylphosphine, tri-i-propylphosphine, tri-t-butyl-phosphine, tricyclopentylphosphine and tricyclohexylphosphine.

Ligands for the ruthenium compounds to be used according to this invention are organic or inorganic compounds, atoms or ions which are coordinated to a metal centre.

Within the scope of this invention, it is particularly convenient to use those ligands which are selected from a group of ligands (A) consisting of nitrogen ($N_2$); monocyclic, polycyclic or condensed arenes which are unsubstituted or substituted by OH, $C_1$–$C_4$alkyl, $C_1$–$C_4$alkoxy, $C_6$–$C_{12}$aryl or halogen and containing 6 to 24, preferably 6 to 18 and, particularly preferably, 6 to 12, carbon atoms; monocyclic heteroarenes which are unsubstituted or substituted by $C_1$–$C_4$alkyl, $C_1$–$C_4$alkoxy or halogen; condensed heteroarenes; condensed arene/heteroarenes containing 3 to 22, preferably 4 to 16 and, particularly preferably, 4 to 10, carbon atoms, and 1 to 3 hetero atoms selected from the group consisting of 0, S and N; and aliphatic, cycloaliphatic, aromatic or araliphatic nitriles which are unsubstituted or substituted by $C_{1-C4}$alkyl, $C_1$–$C_4$alkoxy or halogen and containing 1 to 22, preferably 1 to 18, particularly preferably 1 to 12 and, very particularly preferably, 1 to 7, carbon atoms. The preferred substituents are methyl, ethyl, methoxy, ethoxy, fluoro, chloro and bromo. The arenes and heteroarenes are preferably substituted by one to three radicals. Of the heteroarenes the electron-rich heteroarenes are preferred.

Some examples of arenes and heteroarenes are benzene, cumene, biphenyl, naphthalene, anthracene, acenaphthene, fluorene, phenanthrene, pyrene, chrysene, fluoroanthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. Preferred arenes and heteroarenes are unsubstituted or substituted benzene, naphthalene, cumene, thiophene and benzothiophene. Arene is very particularly preferably benzene or benzene which is substituted by 1 to 3 $C_1$–$C_4$alkyl such as toluene, xylene, trimethylbenzene, isopropylbenzene, tertiary butylbenzene or cumene. Heteroarene is preferably thiophene.

The nitriles may typically be substituted by methoxy, ethoxy, fluoro or chloro. The nitriles are preferably unsubstituted. The alkyl nitriles are preferably linear. Some examples of nitriles are acetonitrile, propionitrile, butyronitrile, pentylnitrile, hexylnitrile, cyclopentyinitrile and cyclohexylnitrile, benzonitrile, methylbenzonitrile, benzyl nitrile and naphthyl nitrile. The nitriles are preferably linear $C_1$–$C_4$alkyinitriles or benzonitrile. Of the alkylnitriles, acetonitrile is particularly preferred.

In a preferred subgroup, the ligands of the group (A) are $N_2$, benzene, thiophene, benzonitrile or acetonitrile which are unsubstituted or substituted by one to three $C_1$–$C_4$alkyl.

Where appropriate, further ligands are present, for examples those selected from the ligand group (B) consisting of solvating inorganic and organic compounds containing the hetero atoms O, S or N, which are also often used as solvents; and cyclopentadienyl or indenyl which are unsubstituted or substituted by $C_1$–$C_4$alkyl, $C_1$–$C_4$alkoxy, $(C_1$–$C_4$alkyl$)_3$Si or $(C_1$–$C_4$alkyl$)_3$SiO—. Typical examples of such compounds are $H_2O$, $H_2S$, $NH_3$; unsubstituted or halogenated, preferably fluorinated or chlorinated, aliphatic or cycloaliphatic alcohols or mercaptans containing 1 to 18, preferably 1 to 12 and, particularly preferably, 1 to 6, carbon atoms, aromatic alcohols or thiols containing 6 to 18, preferably 6 to 12, carbon atoms, araliphatic alcohols or thiols containing 7 to 18, preferably 7 to 12, carbon atoms; open-chain or cyclic and aliphatic, araliphatic or aromatic ethers, thioethers, sulfoxides, sulfones, ketones, aldehydes, carboxylates, lactones, carboxamides which may be N-$C_1$–$C_4$mono- or -dialkylated and containing 2 to 20, preferably 2 to 12 and, particularly preferably, 2 to 6, carbon atoms, and lactams which may be N—$C_1$–$C_4$alkylated; open-chain or cyclic and aliphatic, araliphatic or aromatic, primary, secondary and tertiary amines containing 1 to 20, preferably 1 to 12 and, particularly preferably, 1 to 6, carbon atoms; and cyclopentadienyls such as cyclopentadienyl, indenyl; cyclopentadienyls or indenyis which are methylised or trimethylsilylated once or several times. Typical examples also include allyl, metallyl and crotyl.

Further examples of the ligands of group (B) are methanol, ethanol, n- and i-propanol, n-, i- and t-butanol, 1,1,1-trifluoroethanol, bistrifluoromethylmethanol, tristrifluoromethylmethanol, pentanol, hexanol, methylmercaptan or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n-butyl ether or di-t-butyl ether, tetrahydrofuran, tetrahydropyrane, dioxane, diethyl sulfide, tetrahydrothiophene, dimethylsulfoxide, diethylsulfoxide, tetra- and pentamethylenesulfoxide, dimethyl sulfone, diethyl sulfone, tetra- and pentamethylenesulfone, acetone, methyl ethyl ketone, diethyl ketone, phenylmethyl ketone, methylisobutyl ketone, benzylmethyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl, and trimethylsilylcyclopentadienyl.

The primary amines may conform to formula $R_{29}NH_2$, the secondary amines to formula $R_{29}R_{30}NH$ and the tertiary amines to formula $R_{29}R_{30}R_{31}N$, wherein $R_{29}$ is $C_1$–$C_{18}$alkyl, unsubstituted or $C_1$–$C_4$alkyl- or $C_1$–$C_4$alkoxy-substituted $C_5$- or $C_6$cycloalkyl, or unsubstituted or $C_1$–$C_4$alkyl- or $C_1$–$C_4$alkoxy-substituted $C_6$–$C_{18}$aryl or $C_7$–$C_{12}$aralkyl, $R_{30}$ independently has the meaning of $R_{29}$, or $R_{29}$ and $R_{30}$ together are tetramethylene, pentamethylene, 3-oxa-1,5-pentylene or -$CH_2$—$CH_2$—NH—$CH_2$—$CH_2$- or -$CH_2$—$CH_2$—N($C_1$–$C_4$alkyl)—$CH_2$—$CH_2$-, and $R_{31}$ independently has the meaning of $R_{29}$. Alkyl preferably contains 1 to 12 and, particularly preferably, 1 to 6, carbon atoms. Aryl preferably contains 6 to 12 carbon atoms, and aralkyl preferably contains 7 to 9 carbon atoms. Typical examples of amines are methyl-, dimethyl-, trimethyl-, ethyl-, diethyl-, triethyl-, methylethyl-, dimethylethyl, n-propyl-, di-n-propyl-, tri-n-butyl-, cyclohexyl-, phenyl- and benzylamine, as well as pyrrolidine, N-methylpyrrolidine, piperidine, piperazine, morpholine and N-methylmorpholine.

In a preferred subgroup, the ligands of group (B) are $H_2O$, $NH_3$, unsubstituted or partially or completely fluorinated $C_1$–$C_4$alkanols, or cyclopentadienyl, indenyl, allyl, metallyl or crotyl. $H_2O$, $NH_3$, cyclopentadienyl, indenyl, methanol and ethanol are very particularly preferred.

In a preferred embodiment of this invention, the Ru catalysts and Os catalysts to be used according to this invention contain arenes or heteroarenes as ligands, phosphine groups and anions for charge equalisation. Very particularly preferably they contain an arene group as ligand, a tertiary phosphine group and mono- or divalent anions for charge equalisation.

Suitable anions of inorganic or organic acids are, for example, hydride ($H^-$), halide (e.g. $F^-$, $Cl^-$, $Br^-$ and $I^-$), the anion of an oxygen acid, and $BF_4^-$, $PF_6^-$, $SbF_6^-$ or $AsF_6^-$. It may be mentioned that the above ligands cyclopentadienyl, indenyl, allyl, metallyl and crotyl are anionic and thus also serve the charge equalisation.

Further suitable anions are $C_1$–$C_{12}$alcoholates, preferably $C_1$–$C_6$alcoholates and, particularly preferably, $C_1$–$C_4$alcoholates, which are preferably branched and which typically conform to formula $R_xR_yR_zC$—$O^-$, wherein $R_x$ is H or $C_1$–$C_{10}$alkyl, $R_y$ is $C_1$–$C_{10}$alkyl, and $R_y$ is $C_1$–$C_{10}$alkyl or phenyl, the sum of the carbon atoms of $R_x$, $R_y$ and $R_z$ being at least 2, preferably at least 3 and up to 10. Examples include in particular i-propyloxy and t-butyloxy.

Further suitable anions are $C_3$–$C_1$acetylides, preferably $C_5$–$C_{14}$acetylides and, particularly preferably, $C_5$–$C_{12}$acetylides, which may conform to formula $R_w$—$C\equiv C^-$, wherein $R_w$ is $C_1$–$C_{16}$-alkyl, preferably α-branched $C_3$–$C_{12}$alkyl, typically formula $R_xR_yR_zC$—, or phenyl or benzyl which are unsubstituted or substituted by 1 to 3 $C_1$–$C_4$alkyl or $C_1$–$C_4$alkoxy. Some examples are i-propyl-, i- and t-butyl-, phenyl-, benzyl-, 2-methyl-, 2,6-dimethyl-, 2-i-propyl-, 2-i-propyl-6-methyl-, 2-t-butyl-, 2,6-di-t-butyl- and 2-methyl-6-t-butylphenylacetylide.

The anions of oxygen acids can be, for example, sulfate, phosphate, perchlorate, perbromate, periodate, antimonate, arsenate, nitrate, carbonate, the anion of a $C_1$–$C_8$-carbonic acid such as formate, acetate, propionate, butyrate, benzoate, phenylacetate, mono-, di- or tri-chloroacteate or mono-, di- or trifluoroacetate, sulfonates such as methylsulfonate, ethylsulfonate, propylsulfonate, butylsulfonate, trifluoromethylsulfonate (triflat); phenylsulfonate or benzylsulfonate which is unsubstituted or substituted by $C_1$–$C_4$alkyl, $C_1$–$C_4$alkoxy or halogen, preferably fluoro, chloro or bromo, typically tosylate, mesylate, brosyiate, p-methoxy- or p-ethoxyphenylsulfonate, pentafluorophenyisulfonate or 2,4,6-triisopropylsulfonate, and phosphonates such as methylphosphonate, ethylphosphonate, propylphosphonate, butylphosphonate, phenylphosphonate, p-methylphenylphosphonate or benzylphosphonate.

Particularly preferred are $H^-$, $F^-$, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 3,5-dimethyl-$C_6H_5$—$SO_3^-$, 2,4,6-trimethyl-$C_6H_5$—$SO_3^-$ and 4-$CF_3$—$C_6H_5$—$SO_3^-$ as well as cyclopentadienyl ($Cp^-$).

In a preferred embodiment of this invention, the ruthenium compounds conform to one of formulae VIII to VIIId

  (VIII),

  (VIIIa),

  (VIIIb),

  (VIIIc),

  (VIIId), wherein $R_{32}$ is a phosphine ligand of formula VII or VIIa;

Me is Ru;

n is 1, 2 or 3;

Z is the anion of an inorganic or organic acid;

(a) $L_1$ is a ligand of group A, $L_1$ in formula VIId being identical or different, and (b) $L_2$ is a ligand of group B.

$R_{32}$, Z, $L_1$ and $L_2$ have the meanings and preferred meanings cited above for the phosphines of formulae VII and VIIa.

In formulae VIII to VIIId, n is preferably 1 or 2 and, particularly preferably, 1. $R_{32}$ has the preferred meanings cited for the phosphine ligands of formulae VII and VIIa; they are preferably tertiary phosphines.

It is very particularly preferred to use ruthenium compounds of one of formulae IX to IXd

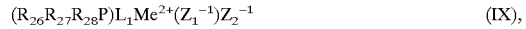  (IX),

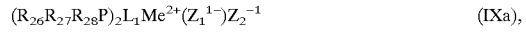  (IXa),

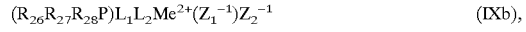  (IXb),

  (IXc),

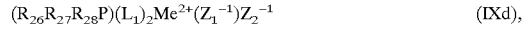  (IXd), wherein

Me is Ru;

$Z_1$ and $Z_2$ are each independently of the other $H^-$, cyclopentadienyl, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 3,5-dimethyl-$C_6H_5$—$SO_3^-$, 2,4,6-trimethyl-$C_6H_5$—$SO_3^-$ or 4-$CF_3$—$C_6H_5$—$SO_3^-$;

$R_{26}$, $R_{27}$ and $R_{28}$ are each independently of one another $C_1$–$C_6$alkyl, or cyclopentyl or cyclohexyl or cyclopentyloxy or cyclohexyloxy, each of which is unsubstituted or substituted by 1 to 3 $C_1$–$C_4$alkyl, or phenyl or benzyl or phenyloxy or benzyloxy, each of which is unsubstituted or substituted by 1 to 3 $C_1$–$C_4$alkyl;

$L_1$ is $C_6$–$C_{16}$arene or $C_5$–$C_{16}$heteroarene which is unsubstituted or substituted by 1 to 3 $C_1$–$C_4$alkyl, $C_1$–$C_4$alkoxy, —OH, —F or Cl, or $C_1$–$C_6$alkyl-CN, benzonitrile or benzylnitrile, $L_1$ in formula IXd being identical or different; and $L_2$ is $H_2O$ or $C_1$–$C_6$alkanol.

If the preparation of the ruthenium catalysts is carried out in solvents which can coordinate to a metal atom, such as to alkanols, then solvating Ru cation complexes can form which are included within the scope of the use of the novel compositions.

Some examples of ruthenium compounds to be used according to this invention are: [tos signifies tosylate]: $(C_6H_{11})_2HPRu(p\text{-cumene})Cl_2$, $(C_6H_{11})_3PRu(p\text{-cumene})Cl_2$, $(C_6H_{11})_3PRu(p\text{-cumene})(tos)_2$, $(C_6H_{11})_3PRu(p\text{-cumene})Br_2$, $(C_6H_{11})_3PRu(p\text{-cumene})ClF$, $(C_6H_{11})_3PRu(C_6H_{6)\text{-}(tos)2}$, $(C_6H_{11})_3PRu(CH_3\text{—}C_6H_5)(tos)_2$, $(C_6H_{11})_3PRu(C_{10}H_8)(tos)_2$, $(i\text{-}C_3H_7)_3PRu(p\text{-cumene})Cl_2$, $(CH_3)_3PRu(p\text{-cumene})Cl_2$, $(C_6H_{11})_3PRu(CH_3\text{—}CN)(C_2H_5\text{—}OH)(tos)_2$, $(C_6H_{11})_3PRu(p\text{-cumene})\text{-}(CH_3\text{—}CN)_2(PF_6)_2$, $(C_6H_{11})_3PRu(p\text{-cumene})(CH_3\text{—}CN)_2(tos)_2$, $(n\text{-}C_4H_9)_3PRu(p\text{-cumene})(CH_3\text{—}CN)_2(tos)_2$, $(C_6H_{11})_3PRu(CH_3CN)Cl_2$, $(C_6H_{11})_3PRu(CH_3\text{—}CN)_2Cl_2$, $(n\text{-}C_4H_9)_3PRu(p\text{-cumene})Cl_2$, $(C_6H_{11})_3PRu(p\text{-cumene})(C_2H_5OH)_2(BF_4)_2$, $(C_6H_{11})_3PRu(p\text{-cumene})(C_2H_5OH)_2(PF_6)_2$, $[(C_6H_{11})_3P]_3Ru(CH_3\text{—}CN)$, $(C_5H_9)_3PRu(p\text{-cumene})Cl_2$, $(C_6H_{11})_3PRu(p\text{-cumene})HCl$, $(C_6H_{11})_3PRu[1,2,4,5\text{-}(CH_3)_4C6H_2]Cl_2$, $(C_6H_{11})_3PRu[1,3,5\text{-}(i\text{-}C_3H_7)_3C_6H_3]Cl_2$, $(C_6H_{11})_3PRu\text{-}[(C_4H_9)\text{—}C_6H_5]Cl_2$, $(C_6H_5)_3PRu(p\text{-cumene})HCl$, $[(C_6H_{11})_3P]_2Ru(CH_3\text{—}CN)(tos)_2$, $RuCl_2(p\text{-cumene})[(C_6H_{11})_2PCH_2CH_2P(C_6H_{11})_2]$, $(C_6H_{11})_3PRu(p\text{-cumene})(C_2H_5OH)(BF_4)_2$, $(C_6H_{11})_3PRu\text{-}(C_6H_6)(C_2H_5OH)_2(tos)_2$, $(C_6H_{11})_3PRu(i\text{-}C_3H_7\text{—}C_6H_5)(tos)_2$, $(C_6H_{11})_3PRu(C_6H_6)(p\text{-cumene})Br_2$, $(C_6H_{11})_3PRu(biphenyl)(tos)_2$, $(C_6H_{11})_3PRu(anthracene)(tos)_2$, $(2\text{-}CH_3C_6H_4)_3PRu(p\text{-cumene})Cl_2$ and $(C_6H_{11})_3PRu(chrysene)(tos)_2$.

These ruthenium compounds to be used according to this invention are known or can be prepared by known and analogous methods starting from the metal halides (for example $RuX_3$ or $[RuareneX_2]_2$ and by reaction with phosphines and ligand formers.

The thermal ruthenium carbene catalysts B are preferably ruthenium carbene having two phosphine ligands and two halogen atoms.

Said ruthenium carbene catalysts B may preferably conform to formula X or Xa or to mixtures of compounds of formulae X and Xa

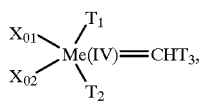

(X)

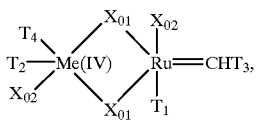

(Xa)

wherein

Me is ruthenium;

$T_1$ and $T_2$ are each independently of the other a tertiary phosphine, or $T_1$ and $T_2$ together are a ditertiary diphosphine;

$T_3$ is H, $C_1$–$C_{12}$ alkyl; $C_3$–$C_8$ cycloalkyl, $C_3$–$C_7$ heterocycloalkyl having one or two hetero atoms selected from the group consisting of —O—, —S— and —N—, $C_6$–$C_{14}$ aryl, or $C_4$–$C_{15}$ heteroaryl having one to three hetero atoms selected from the group consisting of —O—, —S— and —N—, which are unsubstituted or substituted by $C_1$–$C_{12}$ alkyl, $C_1$–$C_{12}$ haloalkyl, $C_1$–$C_{12}$ alkoxy, $C_6$–$C_{10}$ aryl, $C_6$–$C_{10}$ aryloxy —$NO_2$ or halogen;

$T_4$ is $C_6$–$C_{16}$ arene or $C_4$–$C_{15}$ heteroarene which is unsubstituted or substituted by 1 to 3 $C_1$–$C_4$-alkyl, $C_1$–$C_4$ haloalkyl, $C_1$–$C_4$ alkoxy, —OH, F, Cl or Br, and $X_{01}$ and $X_{02}$ are each independently of the other halogen.

$X_{01}$ and $X_{02}$ in formulae X and Xa are preferably F, Cl or Br, more preferably Cl or Br and, most preferably, each Cl.

In a preferred embodiment of this invention, $T_3$ is a hydrogen atom, or $T_3$ is a hydrocarbon radical defined within the scope of this invention containing 1 to 16, more preferably 1 to 12, carbon atoms.

$T_3$ defined as alkyl may preferably contain 1 to 8 and, particularly preferably, 1 to 6 carbon atoms. Some examples of alkyl are methyl, ethyl and the isomers of propyl, butyl, pentyl, hexyl, heptyl, octyl, nonyl, decyl, undecyl and dodecyl. $T_3$ is particularly preferably linear $C_1$–$C_4$ alkyl.

$T_3$ defined as cycloalkyl may preferably contain 5 to 8 carbon atoms. Cyclopentyl and cyclohexyl are particularly preferred.

$T_3$ defined as heterocycloalkyl may preferably contain 4 or 5 carbon atoms and is preferably a hetero atom selected from the group consisting of —O—, —S— and —N—. Some examples are tetrahydrofuranyl, pyrrolidinyl, piperazinyl and tetrahydrothiophenyl. Heterocycloalkyl and aryl are preferably linked via a carbon atom of the ring.

$T_3$ defined as aryl may preferably contain 6 to 10 carbon atoms. Preferred examples are naphthyl and, in particular, phenyl, as well as phenyl which is substituted by $C_1$–$C_4$ alkyl, $C_1$–$C_4$ alkoxy or Cl, typically p-methylphenyl, p-ethylphenyl, p-n- or p-i-propylphenyl, p-n-, p-i- or p-t-butylphenyl, p-chlorophenyl and p-methoxyphenyl.

$T_3$ defined as heteroaryl may preferably contain 4 or 5 carbon atoms and one or two hetero atoms selected from the group consisting of —O—, —S— and —N—. Some examples are furanyl, thiophenyl, pyrrolyl, pyridinyl and pyrimidinyl.

Preferred substituents for $T_3$ are methyl, ethyl, n- and i-propyl, n-, i- and t-butyl, methoxy, ethoxy, trichloromethyl, trifluoromethyl, phenyl, phenyloxy, F and Cl.

In a preferred embodiment of this invention, $T_3$ is H, $C_1$–$C_4$ alkyl, cyclopentyl, cyclohexyl, phenyl or naphthyl, each of which is unsubstituted or substituted by $C_1$–$C_4$ alkyl, $C_1$–$C_4$-alkoxy, $C_1$–$C_4$ haloalkyl, phenyl, F or Cl.

$T_4$ in formula Xa defined as arene preferably contains 6 to 12 carbon atoms and, defined as heteroarene, preferably 4 to 11 carbon atoms, and preferably contains 1 to 3 hetero atoms selected from the group consisting of O, S and N. Some examples of substituents for $T_4$ are methyl, ethyl, n- or i-propyl, n-, i- or t-butyl, methoxy, ethoxy, trifluoromethyl, F and Cl. Preferred arenes and heteroarenes are benzene, toluene, xylene, trimethylbenzene, naphthalene, biphenyl, anthracene, acenaphthene, fluorene, phenantrene, pyrene, chrysene, fluoroanthrene, furan, thiophene, pyrrole, pyridine, γ-pyran, y-thiopyran, pyrimidine, pyrazine, indole, coumarone, thionaphthene, carbazole, dibenzofuran, dibenzothiophene, pyrazole, imidazole, benzimidazole, oxazole, thiazole, isooxazole, isothiazole, quinoline, isoquinoline, acridine, chromene, phenazine, phenoxazine, phenothiazine, triazine, thianthrene, and purine. Particularly preferred arenes and heteroarenes are benzene, naphthalene, cumene, thiophene and benzthiophene. Arene is very particularly preferably benzene or benzene substituted by $C_1$–$C_4$ alkyl, such as toluene, xylene, isopropylbenzene, tertiary butylbenzene or cumene; and heteroarene is particularly preferably thiophene.

The phosphine group $T_1$ and $T_2$ is preferably tertiary phosphines or ditertiary diphosphines containing 3 to 40, more preferably 3 to 30 and, particularly preferably, 3 to 24, carbon atoms.

The tertiary phosphine and ditertiary diphosphine groups have the meanings and preferred meanings stated above for formulae VII and VIIa.

A preferred subgroup of the compounds of formulae X and Xa are those of formulae Xb and Xc

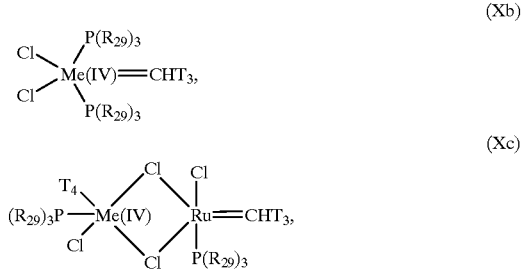

wherein Me is Ru, $R_{29}$ is α-branched $C_3$–$C_8$alkyl, $C_5$–$C_8$cycloalkyl which is unsubstituted or substituted by $C_1$–$C_4$alkyl, $C_1$–$C_4$haloalkyl, $C_1$–$C_4$alkoxy, halogen or —$NO_2$, or $C_6$–$C_{10}$aryl which is unsubstituted or substituted by $C_1$–$C_4$alkyl, $C_1$–$C_4$haloalkyl, $C_1$–$C_4$alkoxy, halogen or —$NO_2$, $T_3$ is H, $C_1$–$C_6$alkyl, $C_5$–$C_8$cycloalkyl which is unsubstituted or substituted by $C_1$–$C_4$alkyl, $C_1$–$C_4$haloalkyl, $C_1$–$C_4$alkoxy, halogen or —$NO_2$, or $C_6$–$C_{10}$aryl which is unsubstituted or substituted by $C_1$–$C_4$alkyl, $C_1$–$C_4$haloalkyl, $C_1$–$C_4$alkoxy, halogen or —$NO_2$, and $T_4$ is phenyl or phenyl substituted by 1 to 3 $C_1$–$C_4$alkyl.

Some specific and preferred examples are [Me signifies Ru(IV)]: $Cl_2[P(C_6H_{11})_3]_2Me=CH—C_6H_5$, $Cl_2[P(C_5H_9)_3]_2Me=CH—C_6H_5$, $Br_2[P(C_6H_{11})_3]_2Me=CH—C_6H_5$, $Br_2—[P(C_5H_9)_3]_2Me=CH—C_6H_5$, $F_2[P(C_6H_{11})_3]_2Me=CH—C_6H_5$, $F_2[P(C_5H_9)_3]_2Me=CH—C_6H_5$, $Cl_2[P(C_6—H_{11})_3]_2Me=CH$ ($C_6H_4$—Cl), $Cl_2[P(C_5H_9)_3]_2Me=CH(C_6H_4$—Br), $Br_2[P(C_6H_{11})_3]_2Me=CH(C_6H_4$—$NO_2$), $Br_2[P(C_5H_9)_3]_2Me=CH(C_6H_4$—$OC_2H_5)_2$, $Cl_2[P(C_6H_{11})_3]_2Me=CH(C_6H_4$—$CH_3$), $F_2[P(C_5H_9)_3]_2Me=CH—[C_6H_3—(CH_3)_2]$, $Cl_2[P(C_6H_{11})_3]_2Me=CH—C_{10}H_9$, $Cl_2[P(C_5H_9)_3]_2Me=CH—CH_3$, $Cl_2[P(C_5H_9)_3]_2Me=CH—CH_3$, $Cl_2[P(C_6H_{11})_3]_2Me=CHCH_3$, $Br_2[P(C_5H_9)_3]_2Me=CH$-i-$C_3H_7$, $Cl_2[P(C_6H_{11})_3]_2Me=CH$-t-$C_4H_9$, $Cl_2[P(C_5H_9)_3]_2Me=CH$-n-$C_4H_9$, $Cl_2[P(C_6H_{11})_3]_2Me=CH—C_6H_4—OCH_3$, $Cl_2[P(C_5H_9)_3]_2Me=CH—C_6H_3—(CH_3)_2$, $Br_2[P(C_6—H_{11})_3]_2Me=CH—C_6H_2—(CH_3)_3$, $Br_2[P(C_5H_9)_3]_2Me=CH—CH_2C_6H_5$, $Cl_2[P(t-C_4H_9)_3]_2Me=CH—C_6H_5$, $Cl_2—[P(i-C_3H_7)_3]_2Me=CH—C_6H_5$, $Cl_2[P(C_6H_5)_3]_2Me=CH—C_6H_5$, $Cl_2[P(C_6H_3—CH_3)_3]_2Me=CH—C_6H_5$, $Br_2—[P(C_5H_4—(CH_3)_2]_3]_2Me=CH—C_6H_5$, $Cl_2[P(C_6H_3—(CH_3)_3]_2Me=CH—C_6H_5$, $Cl_2[P(C_6H_{11})_3—CH_2CH_2—P(C_6H_{11})_3]Me=CH—C_6H_5$, $Cl_2[P(C_5H_9)_3]_2Me=CH—C_6H_{11}$, $Cl_2[P(C_5H_9)_3]_2Me=CH—C_5H_9$, $Cl_2[P(C_5—H_9)_3]_2Me=C(C_6H_{11})_2$, $Cl_2[P(C_6H_{11})_3]_2Me=CH_2$, $Cl_2[P(C_5H_9)_3]_2Me=CH_2$, $Cl_2[P(C_6H_{11})_3]_2Me=CH$-n-butyl, $Cl_2[P(i-C_3H_7)_3]_2Me=CH—C_6H_5$, $Cl_2[P(i-C_3H_7)_3]_2Me=CH—C_5H_{11}$.

The compounds of formula X are known and their preparation is described by P. Schwab et al. in Angew. Chem. (1995), 107, No. 18, pages 2179 to 2181. The binocular compounds of formula Xa can be prepared, for example, by reacting 2 equivalents of a compound of formula X with one equivalent of a per se known compound of formula

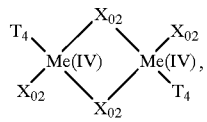

wherein $X_{02}$, Me and $T_4$ have the meanings stated for formula Xa, in the presence of an inert solvent.

Particularly preferred novel mixtures are those, wherein the ruthenium catalyst A conforms to formula IXe, $$(R_{26}R_{27}R_{28}P)L_1Ru^{2+}(Z_1^{-1})_2 \qquad \text{(IXe)},$$

wherein $R_{26}$, $R_{27}$ and $R_{28}$ have the meanings stated above, including the preferred meanings, $L_1$ is an arene or heteroarene, including the preferred meanings stated above, and $Z_1^{1-}$ is $Cl^-$, $Br^-$, $BF_4^-$, $PF_6^-$, $SbF_6^-$, $AsF_6^-$, $CF_3SO_3^-$, $C_6H_5—SO_3^-$, 4-methyl-$C_6H_5—SO_3^-$, 3,5-dimethyl-$C_6H_5—SO_3^-$, 2,4,6-trimethyl-$C_6H_5—SO_3^-$ or 4-$CF_3—C_6H_5—SO_3^-$; and the ruthenium carbene catalyst B conforms to formula X and, particularly preferably, to formula Xb.

The novel mixtures are excellently suitable as catalysts for the ring-opening metathesis polymerisation of strained cycloolefins.

In another of its aspects, the invention relates to a composition consisting of (a) at least one strained cycloolefin and (b) a catalytically effective amount of a mixture of at least one thermal carbene-free ruthenium catalyst A and at least one thermal ruthenium carbene catalyst B, both of which initiate the ring-opening metathesis polymerisation on their own, said catalysts being present in a weight ratio of A to B from 10:1 to 1:10. The catalysts in the novel compositions have the same preferred meanings as described above.

Catalytically effective signifies that the mixture is used in amounts which give, at a defined polymerisation cycle for a specific cycloolefin (see Examples), shaped articles having better physical and mechanical properties than when half the amount is used as individual components.

In a preferred embodiment of this invention, the amount of the novel mixture in the composition is from 0.05 to 0.3% by weight, preferably from 0.05 to 0.25% by weight and, most preferably, from 0.1 to 0.2% by weight, based on the amount of the cycloolefins present.

The cyclic olefins may be monocyclic or polycyclic condensed and/or bridged and/or linked ring systems, for example having from two to four rings, which are unsubstituted or substituted and may contain hetero atoms, for example an O, S, N or Si atom, in one or more than one ring and/or may contain condensed aromatic or heteroaromatic rings, for example o-phenylene, o-naphthylene, o-pyridinylene or o-pyrimidinylene. The individual cyclic rings may contain from 3 to 16, preferably from 3 to 12 and, particularly preferably, from 3 to 8, ring members. The cyclic olefins may contain further non-aromatic double bonds, preferably, depending on the ring size, from 2 to 4 such additional double bonds. The ring substituents are inert, that is to say they do not adversely affect the chemical stability and the thermal stability of the ruthenium and osmium catalysts. The cycloolefins are strained rings or ring systems. Individual rings and ring systems having from 5 to 8 carbon atoms in the ring are particularly preferred.

When the cyclic olefins contain more than one double bond, for example from 2 to 4 double bonds, or when mixtures of strained cycloolefins having one double bond and strained cycloolefins having at least two double bonds, for example from 2 to 4 double bonds, are used, then, depending on the reaction conditions, the monomer chosen and the amount of catalyst, it is also possible for crosslinked polymers to be formed.

In a preferred embodiment of the composition according to the invention, the cycloolefins conform to formula II

(II)

wherein

Q$_1$ is a radical having at least one carbon atom which, together with the —CH=CQ$_2$— group, forms an at least 3-membered alicyclic ring which may contain one or more than one hetero atom selected from the group consisting of Si, P, O, N and S; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$-C$_{20}$alkyl, C$_1$-C$_{20}$hydroxyalkyl, C$_1$-C$_{20}$haloalkyl, C$_1$-C$_6$cyanoalkyl, C$_3$-C$_8$cycloalkyl, C$_6$-C$_{16}$aryl, C$_7$-C$_{16}$aralkyl, C$_3$-C$_6$-heterocycloalkyl, C$_3$-C$_{16}$heteroaryl, C$_4$-C$_{16}$heteroaralkyl or by R$_4$—X—; or wherein two adjacent carbon atoms, when present, are substituted by —CO—O—CO— or by —CO—NR$_5$—CO—; or wherein an alicyclic, aromatic or heteroaromatic ring has been fused to adjacent carbon atoms of the alicyclic ring, the former ring being unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$-C$_{20}$alkyl, C$_1$-C$_{20}$hydroxyalkyl, C$_1$-C$_6$cyanoalkyl, C$_3$-C$_8$cycloalkyl, C$_6$-C$_{16}$aryl, C$_7$-C$_{16}$aralkyl, C$_3$-C$_6$heterocycloalk, C$_3$-C$_{16}$heteroaryl, C$_4$-C$_{16}$heteroaralkyl or by R$_{13}$—X$_1$—; X and X$_1$ are each independently of the other —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—; R$_1$, R$_2$ and R$_3$ are each independently of one another C$_1$-C$_{12}$alkyl, C$_1$-C$_{12}$perfluoroalkyl, phenyl or benzyl; R$_4$ and R$_{13}$ are each independently of the other C$_1$-C$_{20}$alkyl, C$_1$-C$_{20}$haloalkyl, C$_1$-C$_{20}$hydroxyalkyl, C$_3$-C$_8$cycloalkyl, C$_6$-C$_{16}$aryl or C$_7$-C$_{16}$-aralkyl; R$_5$ and R$_{10}$ are each independently of the other hydrogen, C$_1$-C$_{12}$alkyl, phenyl or benzyl, the alkyl groups in turn being unsubstituted or substituted by C$_1$-C$_{12}$alkoxy or by C$_3$-C$_8$cycloalkyl; R$_6$, R$_7$ and R$_8$ are each independently of one another C$_1$-C$_{12}$alkyl, C$_1$-C$_{12}$perfluoroalkyl, phenyl or benzyl; M is an alkali metal and M$_1$ is an alkaline earth metal; and u is 0 or 1; it being possible for the alicyclic ring formed with Q$_1$ to contain further non-aromatic double bonds;

Q$_2$ is hydrogen, C$_1$-C$_{20}$alkyl, C$_1$-C$_{20}$haloalkyl, C$_1$-C$_{12}$alkoxy, halogen, —CN or R$_{11}$—X$_2$—, wherein R$_{11}$ is C$_1$-C$_{20}$alkyl, C$_1$-C$_{20}$haloalkyl, C$_1$-C$_{20}$hydroxyalkyl, C$_3$-C$_8$cycloalkyl, C$_6$-C$_{16}$aryl or C$_7$-C$_{16}$aralkyl, and X$_2$ is —C(O)—O— or —C(O)—NR$_{12}$—, wherein R$_{12}$ is hydrogen, C$_1$-C$_{12}$alkyl, phenyl or benzyl;

the above-mentioned cycloalkyl, heterocycloalkyl, aryl, heteroaryl, aralkyl and heteroaralkyl groups being unsubstituted or substituted by C$_1$-C$_{12}$alkyl, C$_1$-C$_{12}$alkoxy, —NO$_2$, —CN or by halogen, and the hetero atoms of the above-mentioned heterocycloalkyl, heteroaryl and heteroaralkyl groups being selected from the group consisting of —O—, —S—, —NR$_9$— and —N=; and R$_9$ is hydrogen, C$_1$-C$_{12}$alkyl, phenyl or benzyl.

Fused alicyclic rings contain preferably from 3 to 8, more preferably from 5 to 8 and, most preferably, 5 or 6, ring carbon atoms.

When an asymmetric centre is present in the compounds of formula I, the compounds may occur in optically isomeric forms. Some compounds of formula I may occur in tautomeric forms (for example keto-enol tautomerism). When an aliphatic C=C double bond is present, geometric isomerism (E-form or Z-form) may also occur. Exo-endo configurations are also possible. Formula I therefore includes all possible stereoisomers present in the form of enantiomers, tautomers, diastereoisomers, E/Z-isomers or mixtures thereof.

In the definitions of the substituents, the alkyl, alkenyl and alkynyl groups may be straight-chain or branched. The same applies also to the (or each) alkyl moiety of alkoxy, alkylthio and alkoxycarbonyl and other alkyl-containing groups. These alkyl groups contain preferably from 1 to 12, more preferably from 1 to 8 and, most preferably, from 1 to 4, carbon atoms. These alkenyl and alkynyl groups contain preferably from 2 to 12, more preferably from 2 to 8 and, most preferably, from 2 to 4, carbon atoms.

Alkyl includes, for example, methyl, ethyl, isopropyl, n-propyl, n-butyl, isobutyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxyisobutyl, 1-hydroxy-sec-butyl, 1-hydroxytert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and also halogenated, preferably fluorinated or chlorinated, alkanes, for example isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Cycloalkyl is preferably C$_5$-C$_8$cycloalkyl, in particular C$_5$- or C$_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile), cyanoethyl (ethylnitrile), 1-cyanoisopropyl, 1-cyano-n-propyl, 2-cyano-n-butyl, 1-cyano-isobutyl, 1-cyano-sec-butyl, 1-cyano-tert-butyl and the various isomeric cyanopentyl and cyanohexyl radicals.

Aralkyl contains preferably from 7 to 12 carbon atoms and, more preferably, from 7 to 10 carbon atoms. It may be, for example, benzyl, phenethyl, 3-phenylpropyl, α-methylbenzyl, phenbutyl or α,α-dimethylbenzyl.

Aryl preferably contains from 6 to 10 carbon atoms. It may be, for example, phenyl, pentaline, indene, naphthalene, azulene or anthracene.

Heteroaryl preferably contains 4 or 5 carbon atoms and one or two hetero atoms from the group O, S and N. It may be, for example, pyrrole, furan, thiophene, oxazole, thiazole, pyridine, pyrazine, pyrimidine, pyridazine, indole, purine or quinoline.

Heterocycloalkyl preferably contains 4 or 5 carbon atoms and one or two hetero atoms from the group O, S and N. It may be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, isopropyloxy, n-butyloxy, isobutyloxy and tert-butyloxy.

Within the scope of this invention, an alkali metal is to be understood as being lithium, sodium, potassium, rubidium or caesium, preferably lithium, sodium or potassium.

Within the scope of this invention, an alkaline earth metal will be understood as being beryllium, magnesium, calcium, strontium or barium, preferably magnesium or calcium.

In the above definitions, halogen will be understood as being fluoro, chloro, bromo or iodo, preferably fluoro, chloro or bromo.

Compounds of formula II that are particularly suitable for the composition according to the invention are those wherein $Q_2$ is hydrogen.

Also preferred for the composition are compounds of formula II in which the alicyclic ring formed by $Q_1$ together with the —CH=$CQ_2$— group has from 3 to 16, preferably from 3 to 12, more preferably from 3 to 8, and, most preferably, from 5 to 8, ring atoms, and which may be monocyclic, bicyclic, tricyclic or tetracyclic ring systems.

It is especially advantageous when the composition according to the invention comprises compounds of formula II, wherein $Q_1$ is a radical having at least one carbon atom which, together with the —CH=$CQ_2$— group, forms a 3- to 20-membered alicyclic ring which may contain one or more than one hetero atom selected from the group Si, O, N and S; and which is unsubstituted or substituted by halogen, =O, —CN, —$NO_2$, $R_1R_2R_3Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$-$C_{12}$alkyl, $C_1$-$C_{12}$haloalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl $C_3$-$C_{12}$heteroaryl, $C_4$-$C_{12}$heteroaralkyl or by $R_4$—X—; or wherein two adjacent carbon atoms in that radical $Q_1$ are substituted by —CO—O—CO— or by —CO—$NR_5$—CO—; or wherein an alicyclic, aromatic or heteroaromatic ring may have been fused to adjacent carbon atoms, which ring is unsubstituted or substituted by halogen, —CN, —$NO_2$, $R_6R_7R_8Si$—, —COOM, —$SO_3M$, —$PO_3M$, —$COO(M_1)_{1/2}$, —$SO_3(M_1)_{1/2}$, —$PO_3(M_1)_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or by $R_{13}$—$X_1$—; X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—; and $R_1$, $R_2$ and $R_3$ are each independently of one another $C_1$-$C_6$alkyl, $C_1$-$C_6$perfluoroalkyl, phenyl or benzyl; M is an alkali metal and $M_1$ is an alkaline earth metal; $R_4$ and $R_{13}$ are each independently of the other $C_1$-$C_{12}$alkyl, $C_1$-$C_{12}$haloalkyl, $C_1$-$C_{12}$hydroxyalkyl, $C_3$-$C_8$cycloalkyl, $C_6$-$C_{12}$aryl or $_7$-$C_{12}$aralkyl; $R_5$ and $R_{10}$ are each independently of the other hydrogen, $C_1$-$C_6$alkyl, phenyl or benzyl, the alkyl groups in turn being unsubstituted or substituted by $C_1$-$C_6$-alkoxy or by $C_3$-$C_6$cycloalkyl; $R_6$, $R_7$ and $R_8$ are each independently of the other $C_1$-$C_6$alkyl, $C_1$-$C_6$perfluoroalkyl, phenyl or benzyl; u is 0 or 1; it being possible for the alicyclic ring formed with $Q_1$ to contain further non-aromatic double bonds;

$Q_2$ is hydrogen, $C_1$-$C_{12}$alkyl, $C_1$-$C_{12}$haloalkyl, $C_1$-$C_6$alkoxy, halogen, —CN or $R_{11}$—$X_2$—, wherein $R_{11}$ is $C_1$-$C_{12}$alkyl, $C_1$-$C_{12}$haloalkyl, $C_1$-$C_{12}$hydroxyalkyl, $C_3$-$C_6$cycloalkyl, $C_6$-$C_{12}$aryl or $C_7$-$C_{12}$aralkyl, and $X_2$ is —C(O)—O— or —C(O)—$NR_{12}$—, wherein $R_{12}$ is hydrogen, $C_1$-$C_6$alkyl, phenyl or benzyl;

and the cycloalkyl, heterocycloalkyl, aryl, heteroaryl, aralkyl and heteroaralkyl groups being unsubstituted or substituted by $C_1$-$C_6$alkyl, $C_1$-$C_6$alkoxy, —$NO_2$, —CN or by halogen, and the hetero atoms of the heterocycloalkyl, heteroaryl and heteroaralkyl groups being selected from the group consisting of —O—, —S—, —$NR_9$— and —N=; and $R_9$ is hydrogen, $C_1$-$C_6$alkyl, phenyl or benzyl.

From that group preference is given to those compounds of formula oil, wherein $Q_1$ is a radical having at least one carbon atom which, together with the —CH=$CQ_2$— group, forms a 3- to 10-membered alicyclic ring which may contain a hetero atom selected from the group Si, O, N and S, and which is unsubstituted or substituted by halogen, —CN, —$NO_2$, $R_1R_2R_3Si$—, —COOM, —$SO_3M$, —$PO_3M$, —$COO(M_1)_{1/2}$, —$SO_3(M_1)_{1/2}$, —$PO_3(M_1)_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl, benzyl or by $R_4$—X—; or wherein an alicyclic, aromatic or heteroaromatic ring may have been fused to adjacent carbon atoms, which ring is unsubstituted or substituted by halogen, —CN, —$NO_2$, $R_6R_7R_8Si$—, —COOM, —$SO_3M$, —$PO_3M$, —$(COO(M_1)_{1/2}$, —$SO_3(M_1)_{1/2}$, —$PO_3(M_1)_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl, benzyl or by $R_{13}$—$X_1$—; $R_1$, $R_2$ and $R_3$ are each independently of one another $C_1$-$C_4$alkyl, $C_1$-$C_4$perfluoroalkyl, phenyl or benzyl; M is an alkali metal and $M_1$ is an alkaline earth metal; $R_4$ and $R_{13}$ are each independently of the other $C_1$-$C_6$alkyl, $C_1$-$C_6$haloalkyl, $C_1$-$C_6$hydroxyalkyl or $C_3$-$C_6$cycloalkyl; X and $X_1$ are each independently of the other —O—, —S—, —CO—, —SO— or —$SO_2$—; $R_6$, $R_7$ and $R_8$ are each independently of one another $C_1$-$C_4$alkyl, $C_1$-$C_4$perfluoroalkyl, phenyl or benzyl; and $Q_2$ is hydrogen.

The composition according to the invention preferably comprises norbornene and norbornene derivatives, norbornadiene, cyclopentene, cycloheptene, cyclooctene, cyclooctadiene or cyclododecene. Of the norbornene derivatives, special preference is given to those corresponding to formula III

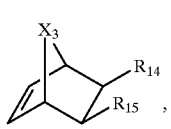

(III)

wherein $X_3$ is —$CHR16$—, oxygen or sulfur;

$R_{14}$ and $R_{15}$ are each independently of the other hydrogen, —CN, trifluoromethyl, $(CH_3)_3Si$—O—, $(CH_3)_3Si$— or —$COOR_{17}$; and $R_{16}$ and $R_{17}$ are each independently of the other hydrogen, $C_1$–$C_{12}$alkyl, phenyl or benzyl; or to formula IV

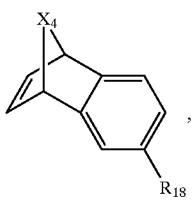

(IV)

wherein $X_4$ is —$CHR_{19}$—, oxygen or sulfur;

$R_{18}$ is hydrogen, $C_1$–$C_6$alkyl or halogen; and $R_{19}$ is hydrogen, $C_1$–$C_{12}$alkyl, phenyl or benzyl;

or to formula V

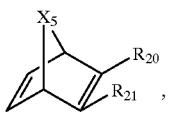

(V)

wherein $X_5$ is —$CHR_{22}$—, oxygen or sulfur;

$R_{20}$ and $R_{21}$ are each independently of the other hydrogen, CN, trifluoromethyl, $(CH_3)_3Si$—O—, $(CH_3)_3Si$— or —$COOR_{23}$; and $R_{22}$ is hydrogen, $C_1$–$C_{12}$alkyl, phenyl or benzyl;

$R_{23}$ is hydrogen, $C_1$–$C_{12}$alkyl, phenyl or benzyl;

or to formula VI,

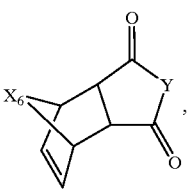

(VI)

wherein $X_6$ is —$CHR_{24}$—, oxygen or sulfur;

Y is oxygen or >N—$R_{25}$, $R_{24}$ is hydrogen, $C_1$–$C_{12}$alkyl, phenyl or benzyl; and $R_{25}$ is hydrogen, methyl, ethyl or phenyl.

Another preferred subgroup of monomers is formed by those composed only of carbon and hydrogen.

The following compounds of formula I which may be preparable by Diels-Alder reactions are some specific examples, it being possible for the oxanorbornene derivatives also to be norbornene derivatives and vice versa:

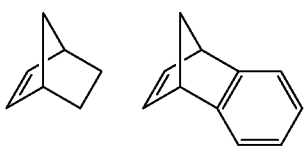

-continued

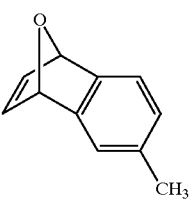 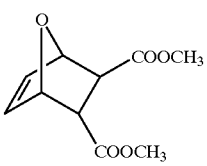

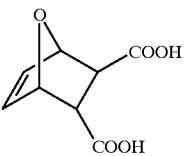 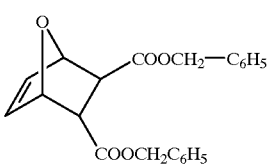

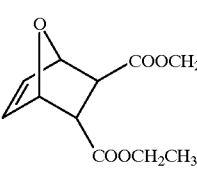 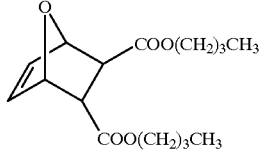

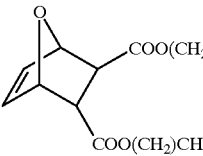

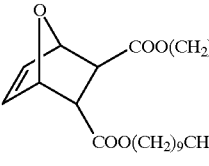

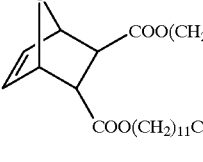

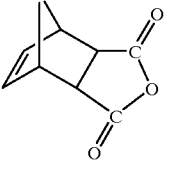

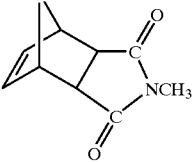

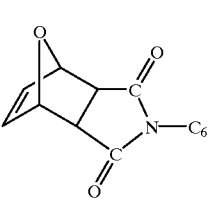
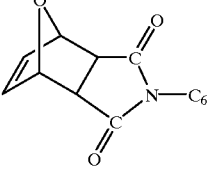

-continued

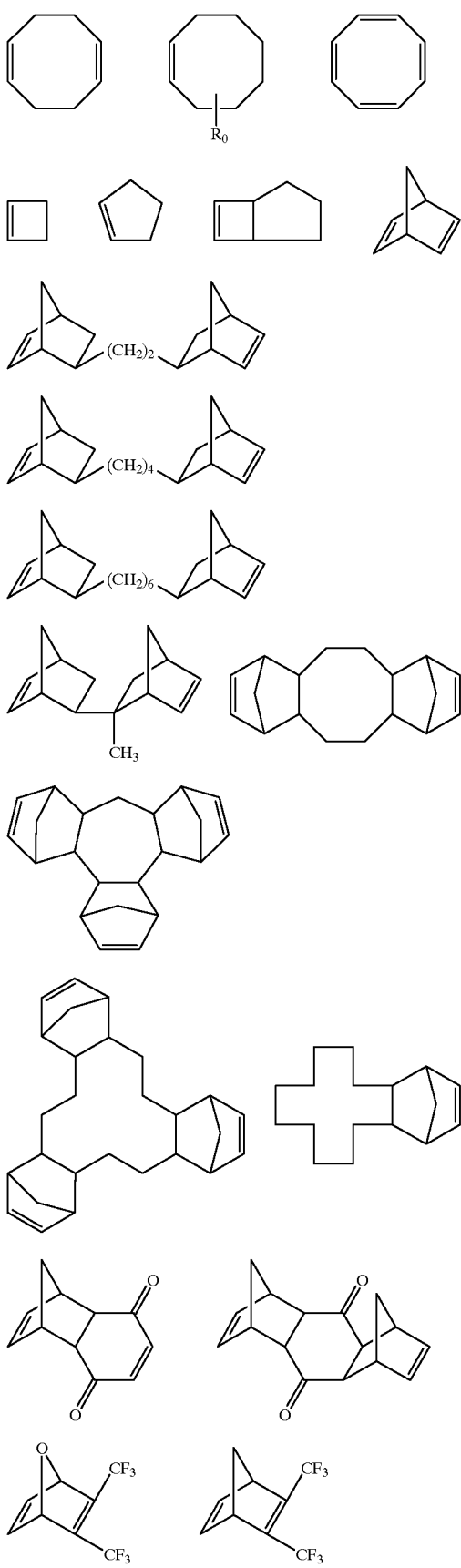

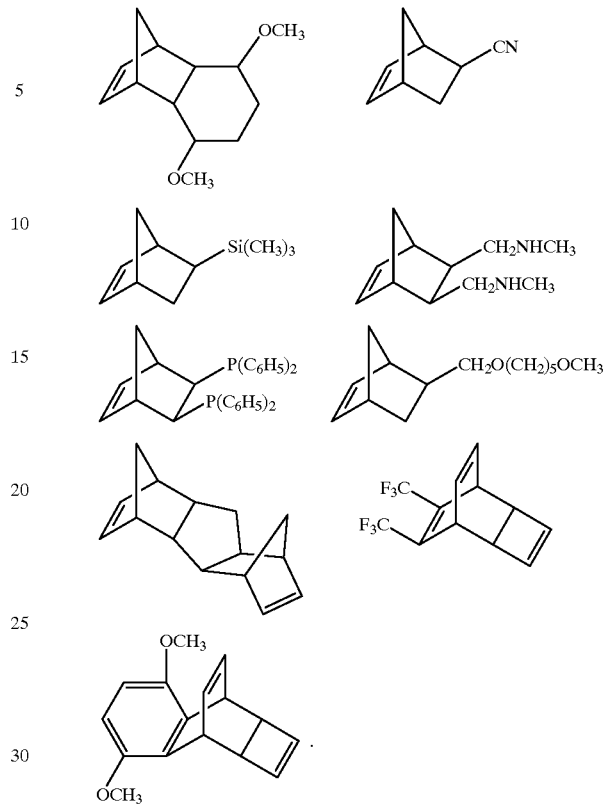

$R_0$ can, for example, be an epoxy, acrylate or methacrylate group which is covalently bonded to the cyclooctene directly or via a bridge group.

Condensed and/or bridged and/or linked olefinically unsaturated ring systems are generally prepared by means of Diels-Alder reactions. They should be fusable without decomposition which, within the scope of the invention, means that strained cycloolefins can be fused and the catalyst can be dissolved. In the case of thermally labile strained cycloolefins it may therefore be necessary to dissolve the catalyst under pressure. Where the reaction temperature is higher than the decomposition temperature of the strained cycloolefin, it is advisable to carry out the procedures under pressure in order to avoid decomposition of the monomers prior to polymerisation.

A preferred subgroup are the Diels-Alder adducts of cyclopentadienes, many of which are known and are commercially available (they are obtained, for example, in petroleum distillation), or which can be prepared in known manner by a Diels-Alder reaction of cyclopentadienes with cyclopentadienes, or with Diels-Alder adducts of cyclopentadienes (oligocyclopentadienes). These Diels-Alder adducts can conform to formula I

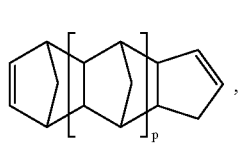
(I)

wherein p is 0 or a number from 1 to 100, preferably from 1 to 50, particularly preferably from 1 to 20 and, most preferably, from 1 to 10, and wherein the adduct may be substituted as stated above for the Diels-Alder adducts, preferably by $C_1$–$C_6$alkyl groups.

Illustrative examples of compounds of formula I are

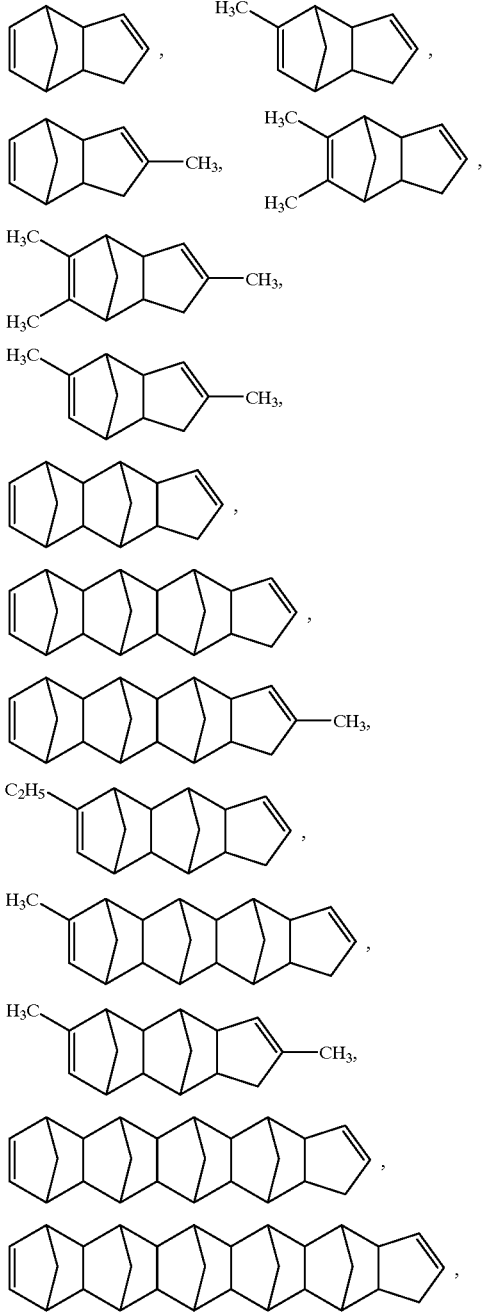

as well as tricyclopentadiene.

Another preferred subgroup of Diels-Alder adducts are those of unsubstituted or substituted norbornenes or norbornadienes with unsubstituted or substituted 1,3-cyclopentadienes. Particularly preferred Diels-Alder adducts are those of formula Ia

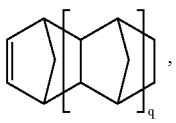

wherein q is preferably a number from 1 to 20, more preferably from 1 to 10 and, particularly preferably, from 1 to 5, the Diels-Alder adducts being unsubstituted or substituted by, preferably, $C_1$–$C_6$alkyl.

Illustrative examples of compounds of formula Ia are

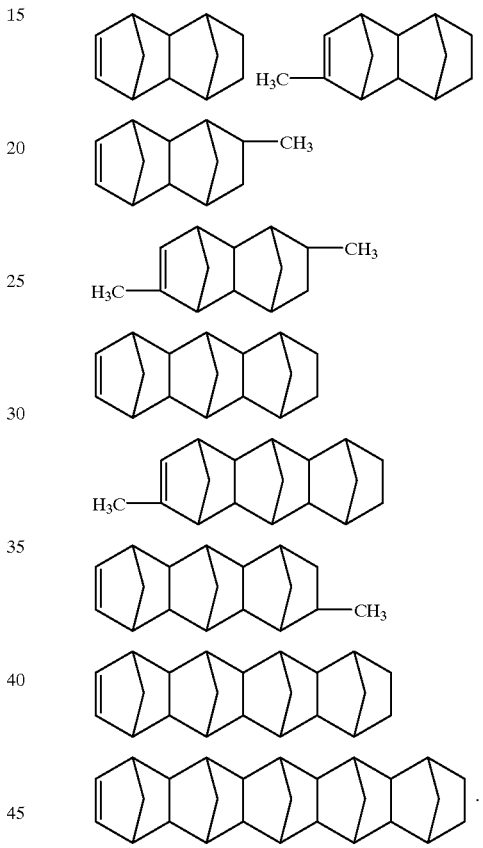

The composition according to the invention may additionally contain further open-chain comonomers that form copolymers with the strained cycloolefins. When dienes are additionally used, for example, crosslinked polymers may be formed. Some examples of such comonomers are olefinically mono- or di-unsaturated compounds, such as olefins and dienes from the group ethene, propene, butene, pentene, hexene, heptene, octene, decene, dodecylene, cyclohexene (which, as is known, does not form metathesis polymers on its own), acrylic and methacrylic acid and the esters and amides thereof, vinyl ethers, vinyl esters, vinyl chloride, vinylidene chloride, styrene, butadiene, isoprene and chlorobutadiene. When volatile comonomers are additionally used, it is often necessary to carry out the procedures under pressure. The additional use of non-volatile comonomers can therefore be of advantage to the method.

The further open-chain olefins suitable for copolymerisation are present in the novel composition in an amount of typically up to 80% by weight, preferably from 0.1 to 80% by weight, more preferably from 0.5 to 60% by weight and, most preferably, from 5 to 40% by weight, based on the total amount of compounds of di- and oligocyclopentadienes and further olefins capable of copolymerisation.

The composition according to the invention may contain formulation auxiliaries. Known auxiliaries are antistatics, antioxidants, light stabilisers, plasticisers, dyes, pigments, fillers, reinforcing fillers, lubricants, adhesion promoters, viscosity-increasing agents and demoulding auxiliaries. The fillers may be present in surprisingly high proportions without having an adverse effect on the polymerisation, for example in amounts of up to 80% by weight, preferably from 1 to 70% by weight, more preferably from 5 to 70% by weight, particularly preferably from 5 to 60% by weight and, most preferably, from 10 to 60% by weight, based on the composition. A great variety of fillers and reinforcing fillers for improving the optical, physical, mechanical and electrical properties is known. Some examples are glass and quartz in the form of powders, beads and fibres, metal and semimetal oxides, carbonates such as $MgCO_3$, $CaCO_3$, dolomite, metal sulfates such as gypsum and barite, natural and synthetic silicates such as talc, zeolites, wollastonite, feldspars, argillaceous earths, such as China clay, crushed stone, whiskers, carbon fibres, plastics fibres or powders, and carbon black. Viscosity-increasing agents are in particular metathesis polymers that have olefinically unsaturated groups and can be incorporated into the polymer during polymerisation. Such metathesis polymers are known and are commercially available, for example, under the trade name Vestenamere®. For the same purpose it is also possible to use, for example, poly-1,3-dienes such as polybutadiene, polyisoprene, polychlorobutadiene or copolymers with the basic dienes and one or more olefins. Such polymers are also commercially available, for example Buna® and Kraton®. The amount of viscosity-increasing polymers can be, for example, from 0.1 to 50% by weight, preferably from 1 to 30% by weight and, preferably, from 1 to 20% by weight, based on all the monomers present in the composition. The viscosity-increasing agents serve simultaneously to improve the viscous properties of the polymers. The viscosity of the composition can be adjusted to the desired applications within a wide scope.

The compositions according to the invention are excellently suitable for the direct preparation of shaped articles. Although the catalyst activity is in some cases high, the individual components can be mixed and brought into the desired form because the catalysts dissolve in non-polar and polar monomers even at room temperature or with slight heating. Solubilisers (solvents such as methylene chloride, tetrahydrofuran) can be additionally used and are conveniently removed again before polymerisation. Besides direct preparation of shaped articles, it is also possible to carry out polymerisations in solution or emulsions, the polymers only then being further processed to shaped articles.

In another of its aspects, this invention relates to a process for the preparation of polymers by metathesis polymerisation, which comprises heating a novel composition.

The preferred meanings of the novel process are the same as those of the novel compositions.

The compositions according to the invention are relatively storage-stable, but monomers and catalyst are expediently mixed together only just before processing. The process according to the invention is advantageously carried out in such a manner that shaping, for example to give a coating or a moulding, is combined with the mixing and takes place prior to the polymerisation. In principle, all known shaping procedures, for example extrusion, injection moulding and compression procedures, can be used. The compositions according to the invention are suitable especially as casting resins where appropriate with the application of pressure, for example as in RIM processes (Reaction Injection Moulding).

"Heating" may represent a temperature from 30 to 300° C., preferably from 40 to 300° C., more preferably from 50 to 250° C., particularly preferably from 60 to 250° C. and, most preferably, from 60 to 200° C. The polymerisation times depend essentially on the catalyst activity and the times can vary from seconds to minutes up to several hours. The polymerisation can also be carried out stepwise with increasing temperatures.

Using the process according to the invention it is possible to produce materials (semi-finished articles) for the preparation of mouldings by means of machining techniques or to prepare directly all kinds of mouldings, films, foils and coatings. The invention relates also to the use of the novel composition for the preparation of semi-finished articles, mouldings and foils. The invention relates also to mouldings made from the compositions according to the invention.

Depending on the monomer used, the polymers according to the invention may have very different properties. Some are distinguished by a very high degree of oxygen permeability, low dielectric constants, good thermal stability and low water absorption. Others have excellent optical properties, for example high transparency and low refractive indices. Special mention should also be made of the low degree of shrinkage. They can therefore be used in a very wide variety of technical fields. The avoidance of solvents ensures the production of bubble-free mouldings and coatings even at relatively high polymerisation temperatures.

When used as coatings on the surfaces of support materials, in particular non-polar support materials, the novel compositions are distinguished by high adhesive strength. A physical treatment (for example plasma treatment) or chemical treatment (application of adhesion promoters) can further improve the adhesive strength. The coated materials are also distinguished by a very high degree of surface smoothness and gloss. Among their good mechanical properties, special mention should be made of the low degree of shrinkage and the high impact strength, and also the thermal stability. In addition, they can be readily demoulded when processed in moulds and have a high resistance to solvents. The properties desired in final use can be adjusted selectively by way of the monomers chosen. In addition to rigid and resilient thermoplastic mouldings it is also possible to obtain crosslinked thermosetting or elastomeric polymers.

These polymers are suitable for the production of medical apparatus, implants or contact lenses; for the production of electronic components; as binders for surface-coatings; as photocurable compositions for model-making or as adhesives for bonding substrates having low surface energies (for example Teflon, polyethylene and polypropylene).

The compositions according to the invention are particularly suitable for the preparation of protective coatings on substrates or support materials. The invention relates also to a variant of the process according to the invention for the preparation of coatings on support materials in which a composition according to the invention is applied as a coating to a support, for example by means of immersion, spreading, pouring, rolling, knife-application or centrifugal moulding procedures, and the coating is heated for the purpose of polymerisation. This may be followed by heat treatment. Surfaces of substrates can be modified or protected using that method.

This invention relates also to a composition consisting of (a) a support material and (b) a coating of a composition according to the invention which is applied to at least one surface.

This invention relates likewise to a composition consisting of (a) a support material and (b) a polymeric coating of a composition according to the invention which is applied to at least one surface.

Suitable substrates (support materials) are, for example, glass, minerals, ceramics, plastics, wood, semi-metals, metals, metal oxides and metal nitrides. The coating thicknesses depend essentially on the desired use and may be, for example, from 0.1 to 1000 μm, preferably from 0.5 to 500 μm, more preferably from 1 to 100 μm. The coated materials are distinguished by high adhesive strength and good thermal and mechanical properties.

The preparation of the coated materials according to the invention can be carried out in accordance with known methods, for example spreading, knife-application or pouring processes, such as curtain coating or centrifugal moulding.

The compositions according to the invention are suitable also for the preparation of rubber-like or thermoplastic polymers which can be further crosslinked. For that purpose the strained cycloolefins may contain reactive groups, for example (meth)acrylate or epoxy groups, which are covalently bonded to the cycloolefin directly or via a bridge group.

The compositions according to the invention can also be used as thermally curable adhesives for firm bonding to a very wide range of materials, it being possible to achieve excellent peel resistance.

In addition to having high adhesive strengths, excellent processability, good surface properties (smoothness, gloss), high crosslinking density and resistance to solvents and other liquids, the polymers according to the invention are also distinguished in particular by very good physicomechanical properties, for example high thermal stability, breaking and flexural strength and impact strength, and excellent electrical properties, for example low conductivities, dielectric constants and ($\epsilon$)- and (tan δ)-loss factors. In addition, mention should be made of the high oxygen permeability and low water absorption. Polymers composed only of carbon and hydrogen are particularly valuable from the ecological standpoint because they can, for example, be completely recycled by pyrolysis or harmlessly burned.

The following Examples illustrate the invention in more detail.

USE EXAMPLES

The following catalysts are used:
[1-methyl-4-isopropylbenzene][P($C_6H_{11}$)$_3$]Ru(II)$Cl_2$ (catalyst A).
$Cl_2$[P($C_6H_{11}$)$_3$]$_2$Ru(IV)=CH—$C_6H_5$ (catalyst B).
[1-methyl-4-isopropylbenzene] [P(n-butyl)$_3$] Ru(II)$Cl_2$ (catalyst C).
[(1-methyl-4-isopropylbenzene)Ru$Cl_2$]$_2$ (catalyst D).
$Cl_2$[P(iso-$C_3H_7$)$_3$]$_2$Ru(IV)=CH—$C_6H_5$ (catalyst E).
$Cl_2$[P(cyclohexyl)$_3$]$_2$Ru(IV)=CH-(4-isopropylphenyl) (catalyst F).
$Cl_2$[P(cyclohexyl)$_3$]$_2$Ru(IV)=CH-(4-tert-butylphenyl) (catalyst G).

Abbreviations:
DCPD: dicyclopentadiene
DSC: differential scanning calorimetry (heating rate 10° C./min)
TGA: thermogravimetric analysis (heating rate 10° C./min)
WL: weight loss of polymer powders in % in the temperature range from room temperature to 300° C. determined by TGA
SWE: swelling in toluene (increase in weight in % after 24 h storing in toluene)
REA: reactivity ΔH determined by DSC (in J/g)
$T_g$: glass transition temperature (° C.)
CAT: catalyst in % by weight, based on monomer, e.g. DCPD
n.d.: not determined
RT: room temperature

Examples 1–6

20 g of DCPD (technical quality, produced by Shell) are degassed for 3 min under vacuum (3×$10^8$ Pa) at 45° C. shortly before the catalyst is added. The catalysts are then added and dissolved. If $CH_2Cl_2$ is used as solubiliser, the mixture is subsequently degassed again under vacuum and $CH_2Cl_2$ is removed. The composition is polymerised in a pill glass, curing cycle: 1 h at 80° C., 1 h at 100° C. and 2 h at 120° C.

The reactivity (ΔH) and glass transition temperature are determined by DSC. The weight loss is determined by TGA and swelling is determined gravimetrically. The results are summarised in Table 1.

TABLE 1

| Example | CAT A | CAT B | ΔH | $T_g$ | WL | SWE | Remarks |
|---|---|---|---|---|---|---|---|
| comparison | 0.2 | — | n.d. | <RT | 15.0 | n.d. | soft rubber, smell of DCPD |
| comparison | 0.1 | — | 187 | <RT | n.d. | n.d. | soft rubber, smell of DCPD |
| comparison | — | 0.1 | 288 | 39 | 19.5 | 94 | soft solid, smell of DCPD |
| comparison | — | 0.05 | n.d. | <RT | >30 | n.d. | incompletely polymerised |
| comparison | — | 0.025 | n.d. | <RT | >30 | n.d. | incompletely polymerised |
| 1 | 0.2 | 0.1 | 289 | 124 | 3.1 | 97 | hard solid, no smell of DCPD |
| 2 | 0.1 | 0.1 | 282 | 120 | 2.8 | 94 | hard solid, no smell of DCPD |
| 3 | 0.15 | 0.05 | 302 | 121 | 3.6 | 100 | hard solid, no smell of DCPD |

TABLE 1-continued

| Example | CAT A | CAT B | ΔH | $T_g$ | WL | SWE | Remarks |
|---|---|---|---|---|---|---|---|
| 4 | 0.175 | 0.025 | 261 | 109 | 4.1 | 99 | hard solid, no smell of DCPD |
| 5 | 0.1 | 0.05 | n.d. | 123 | 3.7 | 84 | hard solid, no smell of DCPD |
| 6 | 0.05 | 0.05 | n.d. | 119 | 4.4 | 87 | hard solid, no smell of DCPD |

Example 7

Example 1 is repeated, but using catalist C. The results are summarised in Table 2.

TABLE 2

| Example | CAT C | CAT B | ΔH | $T_g$ | WL | SWE | Remarks |
|---|---|---|---|---|---|---|---|
| comparison | up to 0.5 | — | | | | | no polymerisation |
| comparison | — | 0.1 | 288 | 39 | 19.5 | 94 | soft solid |
| comparison | — | 0.05 | n.d. | <RT | >30 | n.d. | incompletely polymerised |
| comparison | — | 0.025 | n.d. | <RT | >30 | n.d. | incompletely polymerised |
| 7 | 0.15 | 0.05 | n.d. | <20 | n.d. | n.d. | soft rubber, strong smell of DCPD |

Examples 7 and 8

Example 1 is repeated, but using catalyst D. The results are summarised in Table 3.

TABLE 3

| Example | CAT D | CAT B | ΔH | $T_g$ | WL | SWE | Remarks |
|---|---|---|---|---|---|---|---|
| comparison | up to 0.5 | — | | | | | no polymerisation |
| comparison | — | 0.1 | 288 | 39 | 19.5 | 94 | soft solid |
| comparison | — | 0.05 | n.d. | <RT | >30 | n.d. | incompletely polymerised |
| comparison | — | 0.025 | n.d. | <RT | >30 | n.d. | incompletely polymerised |
| 7 | 0.1 | 0.1 | 286 | 61 | 11.1 | n.d. | soft solid |
| 8 | 0.15 | 0.05 | 258 | 28 | 19.5 | n.d. | soft solid |

Examples 9–14

Example 1 is repeated, but using the catalyst and monomers indicated in Table 4. The results are given in Table 4.

Monomers Used

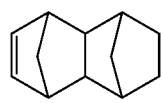

α: tetracyclododecene (TD)

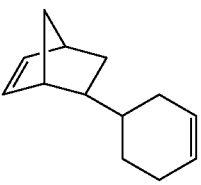

β: cyclohexenylnorbornene (CN) (endo/exo-mixture)

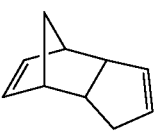

γ: DCPD

TABLE 4

| Example | Monomer | 1. CAT [%] | 2. CAT [%] | $T_g$ [°C] | WL [%] | Observations |
|---|---|---|---|---|---|---|
| comparison | α | E; 0.02 | — | — | — | not polymerised |
| comparison | α | F; 0.02 | — | <25 | — | yellow rubber |
| comparison | α | A; 0.15 | — | 118 | 18.1 | polymerised |
| comparison | α | A; 0.02 | — | 130 | 11.8 | polymerised |
| 9 | α | E; 0.02 | A, 0.15 | 177 | 14.7 | polymerised |
| 10 | α | F; 0.02 | A; 0.15 | 174 | 13.3 | polymerised |
| comparison | β | E; 0.02 | — | <25 | — | yellow rubber |
| comparison | β | F; 0.02 | — | <25 | — | yellow rubber |
| comparison | β | A; 0.50 | — | 96 | — | polymerised |
| comparison | β | A; 0.15 | — | 79 | 5.9 | polymerised |
| 11 | β | E; 0.02 | A; 0.15 | 94 | 3.1 | polymerised |
| 12 | β | F; 0.02 | A; 0.15 | 84 | 4.7 | polymerised |
| comparison | γ | E; 0.05 | — | <25 | — | yellow rubber |
| comparison | γ | F; 0.05 | — | <25 | — | yellow rubber |
| comparison | γ | A; 0.15 | — | <25 | — | yellow rubber |
| 13 | γ | E; 0.05 | A; 0.15 | 60 | 7.8 | polymerised |
| 14 | γ | F; 0.05 | A; 0.15 | 73 | 8.0 | polymerised |

Example 15

A large condenser (paper/Al foil) is predried overnight at 80° C. under high vacuum in a desiccator.

A mixture of 1.2 kg of degassed DCPD (technical quality, produced by Shell) is mixed with 2.4 g (0.2%) of catalyst A and 1.2 g (0.1%) of catalyst G and this mixture is poured to the condenser in a 2 L beaker glass. The mixture is then degassed at room temperature and 0.2 mbar for about 20 minutes and then cured in an oven: 1 hour at 50° C., 1 hour at 60° C., and 1 hour at 70° C. The highly viscous formulation is then postcured for 15 hours at 70° C., giving a solid brown material having good condensing properties.

The $T_g$ value determined by DSC is 33° C. The weight loss determined by TGA is 27%.

What is claimed is:

1. A mixture of at least one thermal carbene-free ruthenium catalyst A and at least one thermal ruthenium carbene catalyst B, both of which initiate the ring-opening metathesis polymerization of strained cycloolefins on their own, said catalysts being present in a weight ratio of A to B from 10:1 to 1:10.

2. A mixture according to claim 1, wherein the ruthenium catalyst A is a compound having one or two ruthenium atoms.

3. A mixture according to claim 2, wherein the carbene-free ruthenium catalyst A is a compound of formula XI

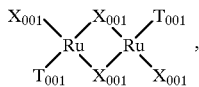

(XI)

wherein $X_{001}$ is Cl, Br or I, and $T_{001}$ is unsubstituted or $C_1$–$C_6$alkyl-substituted $C_6$–$C_{18}$arene or $C_4$–$C_{17}$heteroarene.

4. A mixture according to claim 1 wherein the ruthenium catalyst A contains a phosphine ligand.

5. A mixture according to claim 4, wherein the ruthenium catalyst A is a divalent-cationic compound containing at least one phosphine ligand and a total of 2 to 5 ligands bonded to the ruthenium atom and which contains acid anions for charge equalisation.

6. A mixture according to claim 4, wherein the phosphine ligand conforms to formulae VII or VIIa $$PR_{26}R_{27}R_{28} \quad (VII),$$

$$R_{26}R_{27}P{-}Z_1{-}PR_{26}R_{27} \quad (VIIa),$$

wherein $R_{26}$, $R_{27}$ and $R_{28}$ are each independently of one another H, $C_1$–$C_{20}$alkyl, $C_1$–$C_{20}$-alkoxy; $C_4$–$C_{12}$cycloalkyl or cycloalkoxy which is unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy which is unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which is unsubstituted or substituted by $C_1$–$C_6$alkyl, $C_1$–$C_6$haloalkyl or $C_1$–$C_6$alkoxy; $R_{26}$ and $R_{27}$ together are tetra- or pentamethylene or tetra- or pentamethylenedioxyl, each of which is unsubstituted or substituted by $C_1$–$C_6$-alkyl, $C_1$–$C_6$haloalkyl or $C_1$–$C_6$alkoxy, or tetra- or pentamethylene or tetra- or pentamethylenedioxyl, each of which is unsubstituted or substituted by $C_1$–$C_6$alkyl, $C_1$–$C_6$haloalkyl or $C_{C6}$-alkoxy and condensed with 1 or 2 1,2-phenylene, or tetramethylenedioxyl which is unsubstituted or substituted by $C_1$–$C_6$alkyl, $C_1$–$C_6$haloalkyl or $C_1$–$C_6$alkoxy and condensed in the 1,2- and 3,4-positions with 1,2-phenylene, and $R_{28}$ is as defined above; and $Z_1$ is linear or branched, unsubstituted or $C_1$–$C_4$alkoxy-substituted $C_2$–$C_{12}$alkylene, unsubstituted or $C_1$–$C_4$alkyl- or $C_1$–$C_4$alkoxy-substituted 1,2- or 1,3-cycloalkylene of 4 to 8 carbon atoms, or unsubstituted or $C_1$–$C_4$alkyl- or $C_1$–$C_4$alkoxy-substituted 1,2- or 1,3-heterocycloalkylene having 5 or 6 ring members and a hetero atom which is O or N.

7. A mixture according to claim 1, wherein the ruthenium compound A conforms to one of formulae VIII to VIIId $$R_{32}L_1Me^{2+}(Z^{n-})_{2/n} \quad (VIII),$$

$$R_{32}L_1L_2Me^{2+}(Z^{n-})_{2/n} \quad (VIIIa),$$

$$(R_{32})_2L_1Me^{2+}(Z^{n-})_{2/n} \quad (VIIIb),$$

$$(R_{32})_3L_1Me^{2+}(Z^{n-})_{2/n} \quad (VIIIc),$$

$$R_{32}(L_1)_2Me^{2+}(Z^{n-})_{2/n} \quad (VIIId),$$

wherein

R$_{32}$ is a phosphine ligand of formula VII or VIIa;

Me is Ru;

n is 1, 2 or 3;

Z is the anion of an inorganic or organic acid;

(a) L$_1$ is a ligand of group A, L$_1$ in formula VIId being identical or different, and (b) L$_2$ is a ligand of group B.

8. A mixture according to claim 1, wherein the ruthenium compound A conforms to one of formulae IX to IXd

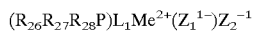 (IX),

 (IXa),

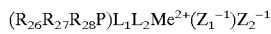 (IXb),

 (IXc),

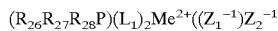 (IXd), wherein

Me is Ru;

Z$_1$ and Z$_2$ are each independently of the other H$^-$, cyclopentadienyl, Cl$^-$, Br$^-$, BF$_4^-$, PF$_6^-$, SbF6$^-$, AsF$_6^-$, CF$_3$SO$_3^-$, C$_6$H$_5$—SO$_3^-$, 4-methyl-C$_6$H$_5$—SO$_3^-$, 3,5-dimethyl-C$_6$H$_5$—SO$_3^-$, 2,4,6-trimethyl-C$_6$H$_5$—SO$_3^-$ or 4-CF$_3$—C$_6$H$_5$—SO$_3^-$;

R$_{26}$, R$_{27}$ and R$_{28}$ are each independently of one another C$_1$–C$_6$alkyl, or cyclopentyl or cyclohexyl or cyclopentyloxy or cyclohexyloxy, each of which is unsubstituted or substituted by 1 to 3 C$_1$–C$_4$alkyl, or phenyl or benzyl or phenyloxy or benzyloxy, each of which is unsubstituted or substituted by 1 to 3 C$_1$–C$_4$alkyl;

L$_1$ is C$_6$–C$_{16}$arene or C$_5$–C$_{16}$heteroarene which is unsubstituted or substituted by 1 to 3 C$_1$–C$_4$alkyl, C$_1$–C$_4$alkoxy, —OH, —F or Cl, or C$_1$–C$_6$alkyl-CN, benzonitrile or benzylnitrile, L$_1$ in formula IXd being identical or different; and L$_2$ is H$_2$O or C$_1$–C$_6$alkanol.

9. A mixture according to claim 1, wherein the ruthenium carbene catalyst B conforms to formula X or Xa or to mixtures of compounds of formulae X and Xa,

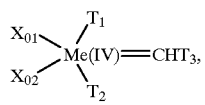 (X)

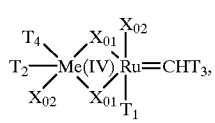 (Xa)

wherein

Me is ruthenium;

T$_1$ and T$_2$ are each independently of the other a tertiary phosphine, or T$_1$ and T$_2$ together are a ditertiary diphosphine;

T$_3$ is H, C$_1$–C$_{12}$alkyl; C$_3$–C$_8$cycloalkyl, C$_3$–C$_7$heterocycloalkyl having one or two hetero atoms selected from the group consisting of —O—, —S— and —N—, C$_6$–C$_{14}$aryl, or C$_4$–C$_{15}$heteroaryl having one to three hetero atoms selected from the group consisting of —O—,—S— and —N—, which are unsubstituted or substituted by C$_1$–C$_{12}$alkyl, C$_1$–C$_{12}$haloalkyl, C$_1$–C$_{12}$alkoxy, C$_6$–C$_{10}$ aryl, C$_6$–C$_{10}$-aryloxy —NO$_2$ or halogen;

T$_4$ is C$_6$–C$_{16}$arene or C$_4$–C$_{15}$heteroarene which is unsubstituted or substituted by 1 to 3 C$_1$–C$_4$-alkyl, C$_1$–C$_4$haloalkyl, C$_1$–C$_4$alkoxy, —OH, F, Cl or Br, and X$_{01}$ and X$_{02}$ are each independently of the other halogen.

10. A mixture according to claim 1, wherein the ruthenium carbene catalyst B conforms to formulae Xb or Xc

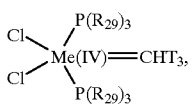 (Xb)

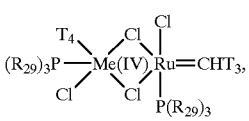 (Xc)

wherein Me is Ru, R$_{29}$ is α-branched C$_3$–C$_8$alkyl, C$_5$–C$_8$cycloalkyl which is unsubstituted or substituted by C$_1$–C$_4$alkyl, C$_1$–C$_4$haloalkyl, C$_1$C$_4$alkoxy, halogen or —NO$_2$, or C$_6$–C$_{10}$aryl which is unsubstituted or substituted by C$_1$–C$_4$alkyl, C$_1$–C$_4$haloalkyl, C$_1$–C$_4$alkoxy, halogen or —NO$_2$, T$_3$ is H, C$_1$–C$_6$alkyl, C$_5$–C$_8$cycloalkyl which is unsubstituted or substituted by C$_1$–C$_4$alkyl, C$_1$–C$_4$haloalkyl, C$_1$–C$_4$alkoxy, halogen or —NO$_2$, or C$_6$–C$_{10}$aryl which is unsubstituted or substituted by C$_1$–C$_4$alkyl, C$_1$–C$_4$haloalkyl, C$_1$–C$_4$alkoxy, halogen or —NO$_2$, and T$_4$ is phenyl or phenyl substituted by 1 to 3 C$_1$–C$_4$alkyl.

11. A composition consisting of (a) at least one strained cycloolefin and (b) a catalytically effective amount of a mixture of at least one thermal carbene-free ruthenium catalyst A and at least one thermal ruthenium carbene catalyst B, both of which initiate the ring-opening metathesis polymerisation of strained cycloolefins on their own, said catalysts being present in a weight ratio of A to B from 10:1 to 1:10.

12. A composition according to claim 11, wherein the mixture is present in the composition in an amount from 0.05 to 0.3% by weight, based on the amount of the cycloolefins present.

13. A composition according to claim 11, wherein the cycloolefin conforms to formula II

 (II)

wherein

Q, is a radical having at least one carbon atom which, together with the —CH=CQ$_2$— group, forms an at least 3-membered alicyclic ring which may contain one or more than one hetero atom selected from the group consisting of Si, P, O, N and S; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M)$_{1/2}$, —PO$_3$(M$_1$)$_{1/2}$, C$_1$–C$_{20}$alkyl, C$_1$–C$_{20}$hydroxyalkyl, C$_1$–C$_{20}$haloalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or by $R_4$—X—; or wherein two adjacent carbon atoms, when present, are substituted by —CO—O—CO— or by —CO—$NR_5$—CO—; or wherein an alicyclic, aromatic or heteroaromatic ring has been fused to adjacent carbon atoms of the alicyclic ring, the former ring being unsubstituted or substituted by halogen, —CN, —$NO_2$, $R_6R_7R_8Si$—$(O)_u$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3C_8$cycloalkyl, $C_6$–$C_{16}$aryl, $C_7C_{16}$aralkyl, $C_3$–$C_6$heterocycloalkyl, $C_3$–$C_{16}$heteroaryl, $C_4$–$C_{16}$heteroaralkyl or by $R_{13}$—$X_1$—; X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or O—$SO_2$—; $R_1$, $R_2$ and $R_3$ are each independently of one another $C_1$–$C_{12}$alkyl, $C_1$–$C_{12}$perfluoroalkyl, phenyl or benzyl; $R_4$ and $R_{13}$ are each independently of the other $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl; $R_5$ and $R_{10}$ are each independently of the other hydrogen, $C_1$–$C_{12}$alkyl, phenyl or benzyl, the alkyl groups in turn being unsubstituted or substituted by $C_1$–$C_{12}$alkoxy or by $C_3$–$C_8$cycloalkyl; $R_6$, $R_7$ and $R_8$ are each independently of one another $C_1$–$C_{12}$alkyl, $C_1$–$C_{12}$perfluoroalkyl, phenyl or benzyl; M is an alkali metal and $M_1$ is an alkaline earth metal; and u is 0 or 1; it being possible for the alicyclic ring formed with $Q_1$ to contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—, wherein $R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl, and $X_2$ is —C(O)—O— or —C(O)—$NR_{12}$—, wherein $R_{12}$ is hydrogen, $C_1$–$C_{12}$alkyl, phenyl or benzyl;

the above-mentioned cycloalkyl, heterocycloalkyl, aryl, heteroaryl, aralkyl and heteroaralkyl groups being unsubstituted or substituted by $C_1$–$C_{12}$alkyl, $C_1$–$Cl_2$alkoxy, —$NO_2$, —CN or by halogen, and the hetero atoms of the above-mentioned heterocycloalkyl, heteroaryl and heteroaralkyl groups being selected from the group consisting of —O—, —S—, —$NR_9$— and —N=; and $R_9$ is hydrogen, $C_1$–$C_{12}$alkyl, phenyl or benzyl.

14. A process for the preparation of polymers by ring-opening metathesis polymerisation, which comprises heating a composition according to claim 11.

15. A composition consisting of (a) a support material and (b) a coating of a composition according to claim 11, which is applied to at least one surface of a substrate selected from the group consisting of glass, minerals, ceramics, plastics, wood, semi-metals, metal oxides and metal nitrides.

* * * * *